(12) United States Patent
Tindall et al.

(10) Patent No.: US 10,245,979 B2
(45) Date of Patent: Apr. 2, 2019

(54) DUAL ACTUATOR

(71) Applicant: Leggett & Platt Canada Co., Halifax (CA)

(72) Inventors: Paul Tindall, Harrow (CA); Horia Blendea, LaSalle (CA); Robert J. McMillen, Tecumseh (CA)

(73) Assignee: LEGGETT & PLATT CANADA CO., Halifax, Nova Scotia (CA)

( * ) Notice: Subject to any disclaimer, the term of this patent is extended or adjusted under 35 U.S.C. 154(b) by 53 days.

(21) Appl. No.: 15/477,953

(22) Filed: Apr. 3, 2017

(65) Prior Publication Data

US 2018/0281632 A1 Oct. 4, 2018

(51) Int. Cl.
*B60N 2/20* (2006.01)
*B60N 2/02* (2006.01)

(52) U.S. Cl.
CPC ............. *B60N 2/20* (2013.01); *B60N 2/0228* (2013.01); *B60N 2/0232* (2013.01); *B60N 2002/0236* (2013.01)

(58) Field of Classification Search
CPC ...... B60N 2/20; B60N 2/0228; B60N 2/0232; B60N 2002/0236
See application file for complete search history.

(56) References Cited

U.S. PATENT DOCUMENTS

| | | | |
|---|---|---|---|
| 4,257,647 A | 3/1981 | Gianessi | |
| 4,379,539 A * | 4/1983 | Rion | B60N 2/0224 248/371 |
| 5,222,994 A | 6/1993 | Hamaue | |
| 6,026,705 A | 2/2000 | Ficyk et al. | |
| 6,637,575 B2 | 10/2003 | Liu et al. | |
| 6,652,028 B2 * | 11/2003 | McMillen | B60N 2/0228 297/284.4 |
| 6,688,443 B2 | 2/2004 | Liu | |
| 6,691,851 B2 | 2/2004 | Liu et al. | |
| 6,860,374 B2 | 3/2005 | Liu et al. | |
| 6,945,600 B2 | 9/2005 | Liu | |

(Continued)

FOREIGN PATENT DOCUMENTS

| CA | 2781912 A1 | 6/2011 |
|---|---|---|
| JP | 2006-335093 | 12/2006 |

OTHER PUBLICATIONS

International Search Report and Written Opinion for Application No. PCT/CA2018/000064 dated May 29, 2018 (7 pages).

*Primary Examiner* — Philip F Gabler
(74) *Attorney, Agent, or Firm* — Michael Best & Friedrich LLP

(57) ABSTRACT

An actuator includes a motor, a gear assembly, a pulley selectively rotatable about an axis by the motor via the gear assembly, at least one biasing member, a first cable connected at one end to the pulley, and a second cable connected at one end to the pulley. The pulley is rotatable in a first pulley direction to a first actuation position to increase tension in the first cable and is rotatable in a second pulley direction opposite the first pulley direction to a second actuation position to increase tension in the second cable. The at least one biasing member is operable to bias the pulley in the second pulley direction when the pulley is in the first actuation position and to bias the pulley in the first pulley direction when in the pulley is the second actuation position.

19 Claims, 17 Drawing Sheets

(56) References Cited

U.S. PATENT DOCUMENTS

| | | | |
|---|---|---|---|
| 6,983,990 B2* | 1/2006 | McMillen | B60N 2/0232 297/284.4 |
| 7,547,070 B2 | 6/2009 | Nathan et al. | |
| 7,802,490 B2 | 9/2010 | Ingraham | |
| 8,047,595 B2* | 11/2011 | Bach | B60N 2/3011 296/65.08 |
| 8,052,216 B2 | 11/2011 | Nathan et al. | |
| 8,061,777 B2 | 11/2011 | Jensen | |
| 8,840,186 B2* | 9/2014 | Samain | B60N 2/0232 297/284.1 |
| 2003/0085599 A1 | 5/2003 | McMillen | |
| 2010/0268133 A1 | 10/2010 | Samain | |
| 2012/0006625 A1 | 1/2012 | Nathan et al. | |
| 2014/0191553 A1 | 7/2014 | Blendea et al. | |
| 2017/0204949 A1* | 7/2017 | Dunn | B60N 2/2251 |

* cited by examiner

DUAL ACTUATOR

BACKGROUND

The present disclosure relates to an actuator, and more specifically to a dual motion actuator for actuating two levers within a vehicle seat to control movement of the vehicle seat.

Actuators in some form are typically used in vehicle seats to control a function of the vehicle seat such as releasing one or more latches to allow for a desired movement function, e.g., folding of the seat or walk-in action (i.e., lateral movement of the seat). Such actuators may include a pulley driven by a motor and a cable (e.g., a Bowden cable) connected at one end to the pulley and another end to a lever of a latch release mechanism. When the motor is energized the pulley is rotated to pull the lever via the cable in order to release a latch of the latch release mechanism to allow for a desired movement. In many applications, for each movement function, a different actuator is provided within the vehicle seat, adding additional weight, electrical noise, and complexity to the seating system.

SUMMARY

In one aspect, an actuator includes a motor, a gear assembly, a pulley selectively rotatable about an axis by the motor via the gear assembly, and at least one biasing member. The actuator further includes a first cable connected at one end to the pulley, and a second cable connected at one end to the pulley. The pulley is rotatable in a first pulley direction to a first actuation position to increase tension in the first cable and rotatable in a second pulley direction opposite the first pulley direction to a second actuation position to increase tension in the second cable. The at least one biasing member is operable to bias the pulley in the second pulley direction when the pulley is in the first actuation position and bias the pulley in the first pulley direction when the pulley is in the second actuation position.

In another aspect, a seat assembly includes a seat, a first seat mechanism, a second seat mechanism, and an actuator. The first seat mechanism includes a first actuation member connected to a first end of a first cable. The second seat mechanism includes a second actuation member connected to a first end of a second cable. The actuator includes a motor, a gear assembly, a pulley assembly, and at least one biasing member. A second end of the first cable and a second end of the second cable are concurrently coupled to a portion of the pulley assembly. The pulley assembly is configured to rotate in one of a first direction and a second direction opposite the first direction in response to activation of the motor. The first cable is configured to actuate the first actuation member when the pulley assembly is rotated in the first direction to a first actuation position. The second cable is configured to actuate the second actuation member when the pulley assembly is rotated in the second direction to a second actuation position. The at least one biasing member is operable to bias the pulley assembly in the second direction when the pulley assembly is in the first actuation position and bias the pulley assembly in the first direction when the pulley assembly is in the second actuation position.

In yet another aspect an actuator includes a motor having an output selectively rotatable in a first direction and a second direction opposite the first direction, a transmission coupled to the output of the motor, and at least one biasing member. The actuator further includes a first cable coupled to the transmission and a second cable coupled to the transmission. The motor is operable to dispose the transmission into a first position to increase tension in the first cable when the output of the motor is rotated in the first direction and to dispose the transmission into a second position to increase tension in the second cable when the output of the motor is rotated in the second direction. The at least one biasing member is configured to bias the transmission from the first position when the transmission is in the first position and to bias the transmission from the second position when the transmission is in the second position.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. The use of "including," "comprising", or "having" and variations thereof herein is meant to encompass the items listed thereafter and equivalents thereof as well as additional items. And as used herein and in the appended claims, the "upper", "lower", "top", "bottom", "front", "back", and other directional terms are not intended to require any particular orientation, but are instead used for purposes of description only. Unless specified or limited otherwise, the terms "mounted," "connected," "supported," and "coupled" and variations thereof are used broadly and encompass both direct and indirect mountings, connections, supports, and couplings.

Figure 1:
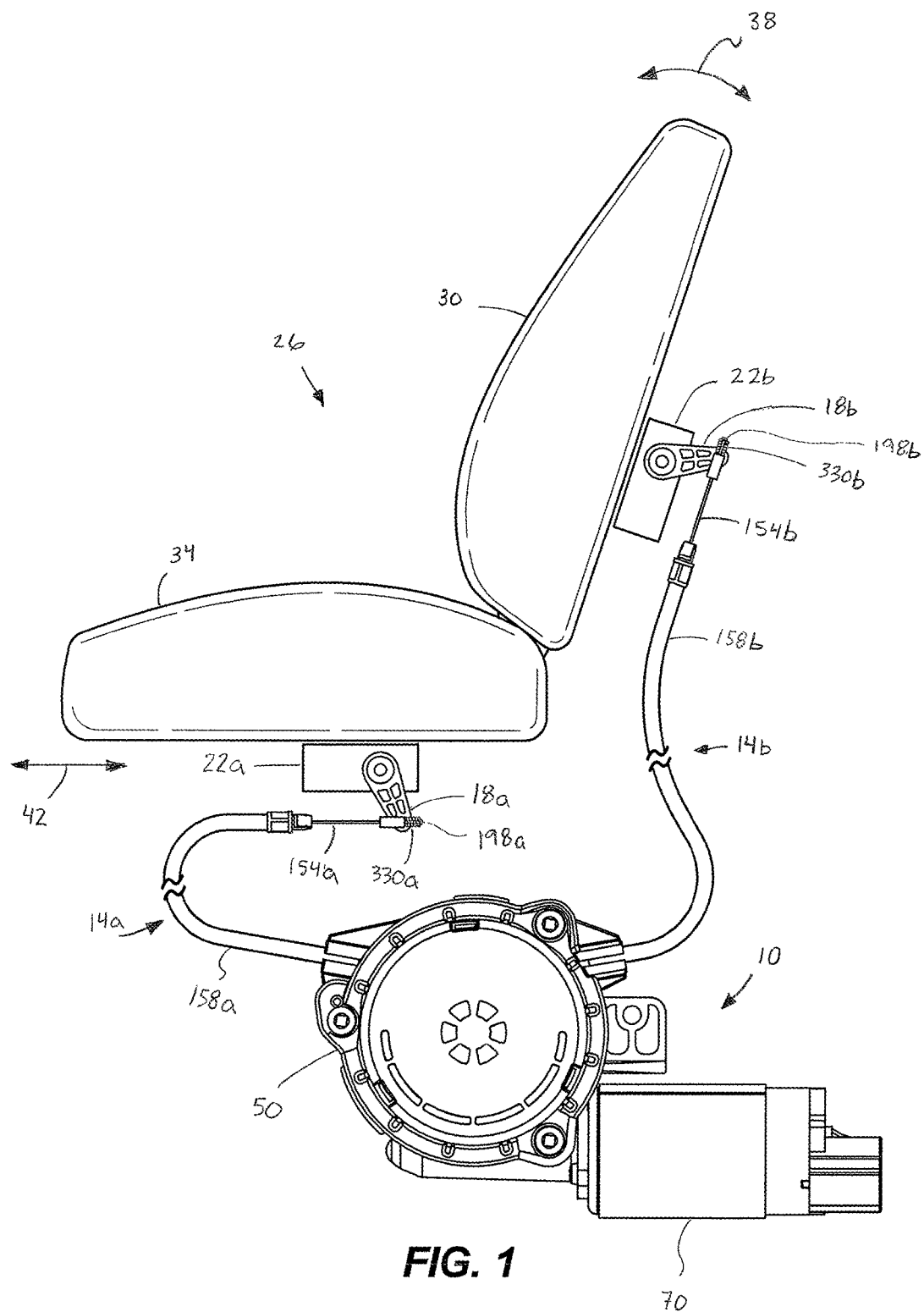
FIG. 1 is a schematic view of an actuator connected to multiple latches of a seat.

FIG. 1 schematically illustrates an actuator 10 connected by a first cable 14a to a first lever 18a of a first release latch mechanism 22a of a seat 26, and by a second cable 14b to a second lever 18b of a second release latch mechanism 22b of the seat 26. The actuator 10 is configured to selectively actuate the first and second levers 18a, 18b via the first and second cables 14a, 14b to cause the first and second release latch mechanisms 22a, 22b, respectively, to release a corresponding latch (not shown) and allow for a corresponding independent movement action to be performed. For example, actuating the first lever 18a may permit a "walk-in" action, in which the seat 26 may be moved in a forward or backward lateral direction 42 (i.e., left or right viewed from FIG. 1) and actuating the second lever 18b may permit a folding action, in which an upper seat portion 30 of the seat 26 is pivoted towards or away from a lower seat portion 34 of the seat 26 in a forward or backward folding direction 38 (i.e., clockwise or counterclockwise viewed from FIG. 1). In some embodiments, the independent movement actions may be manually performed after actuating the release latch mechanisms 22a, 22b. In other embodiments, the movement actions may be automatically performed upon actuating the release latch mechanisms 22a, 22b. In alternative embodiments, actuation of the first and/or second levers 18a, 18b may permit other actions such as changing an angle of inclination of the lower seat portion 34 of the seat 26, adjusting headrest height, etc.

Figure 2:
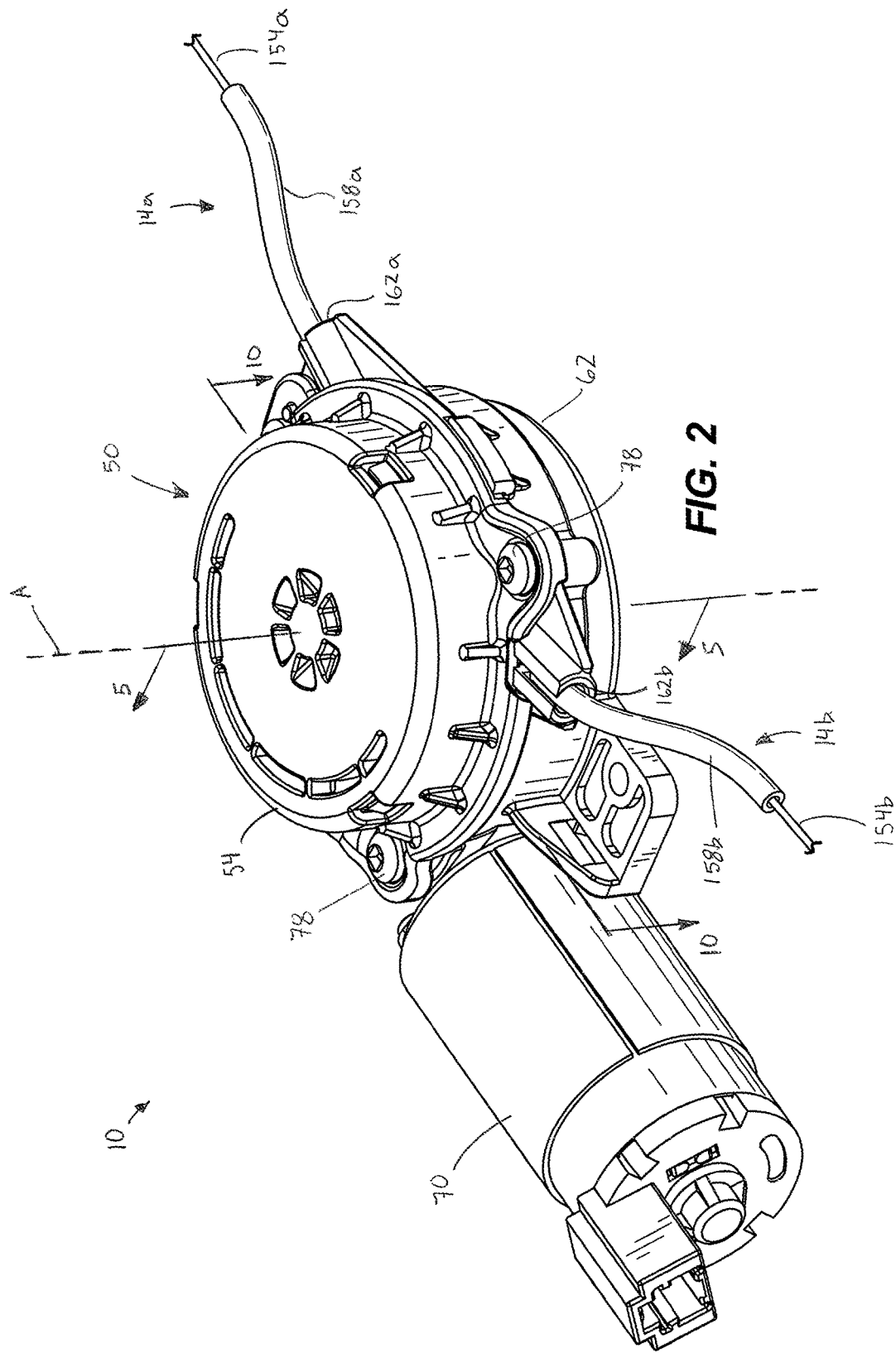
FIG. 2 is a perspective view of the actuator of FIG. 1.
Figure 3:
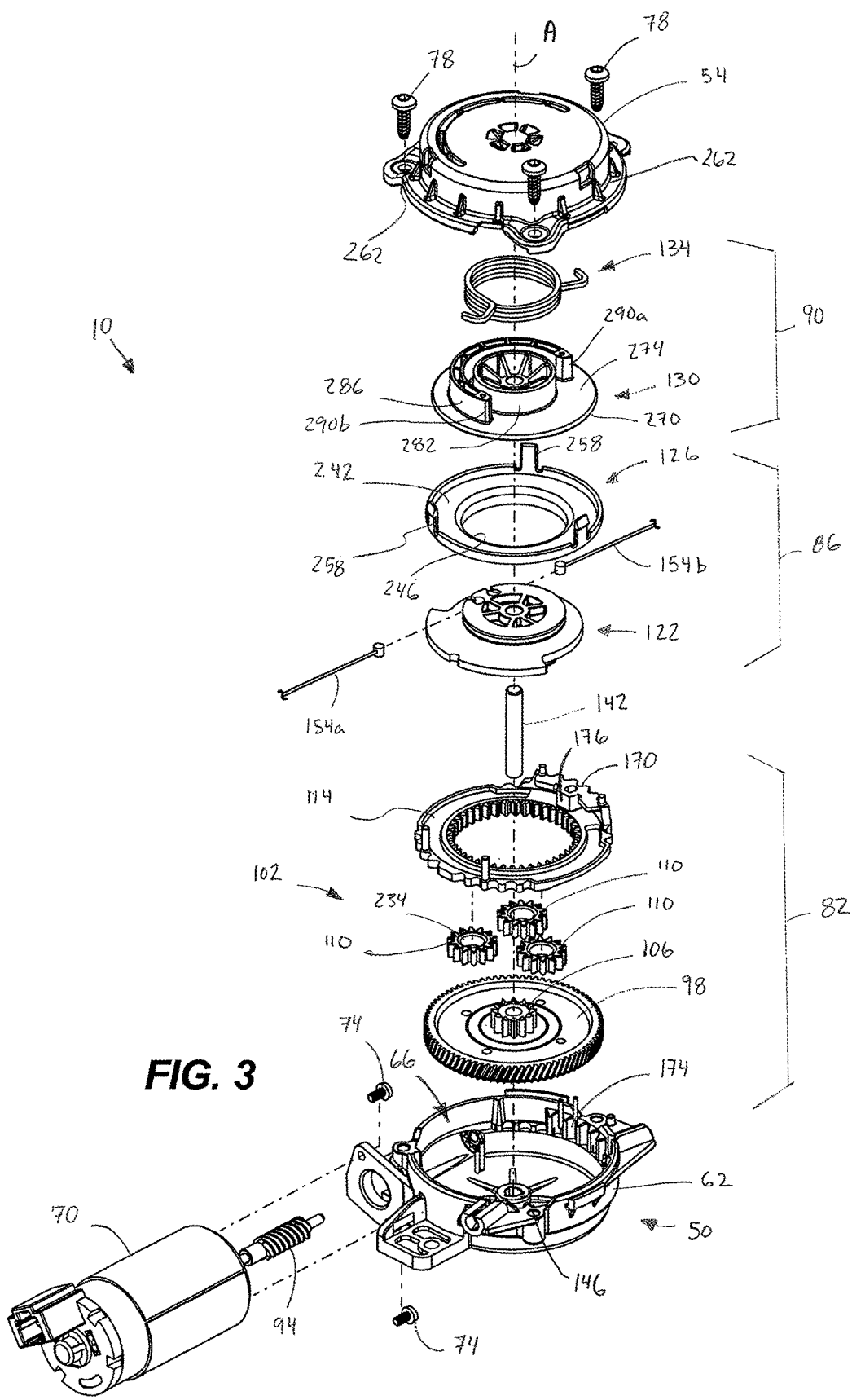
FIG. 3 is an exploded view of the actuator of FIG. 1.
Figure 4:
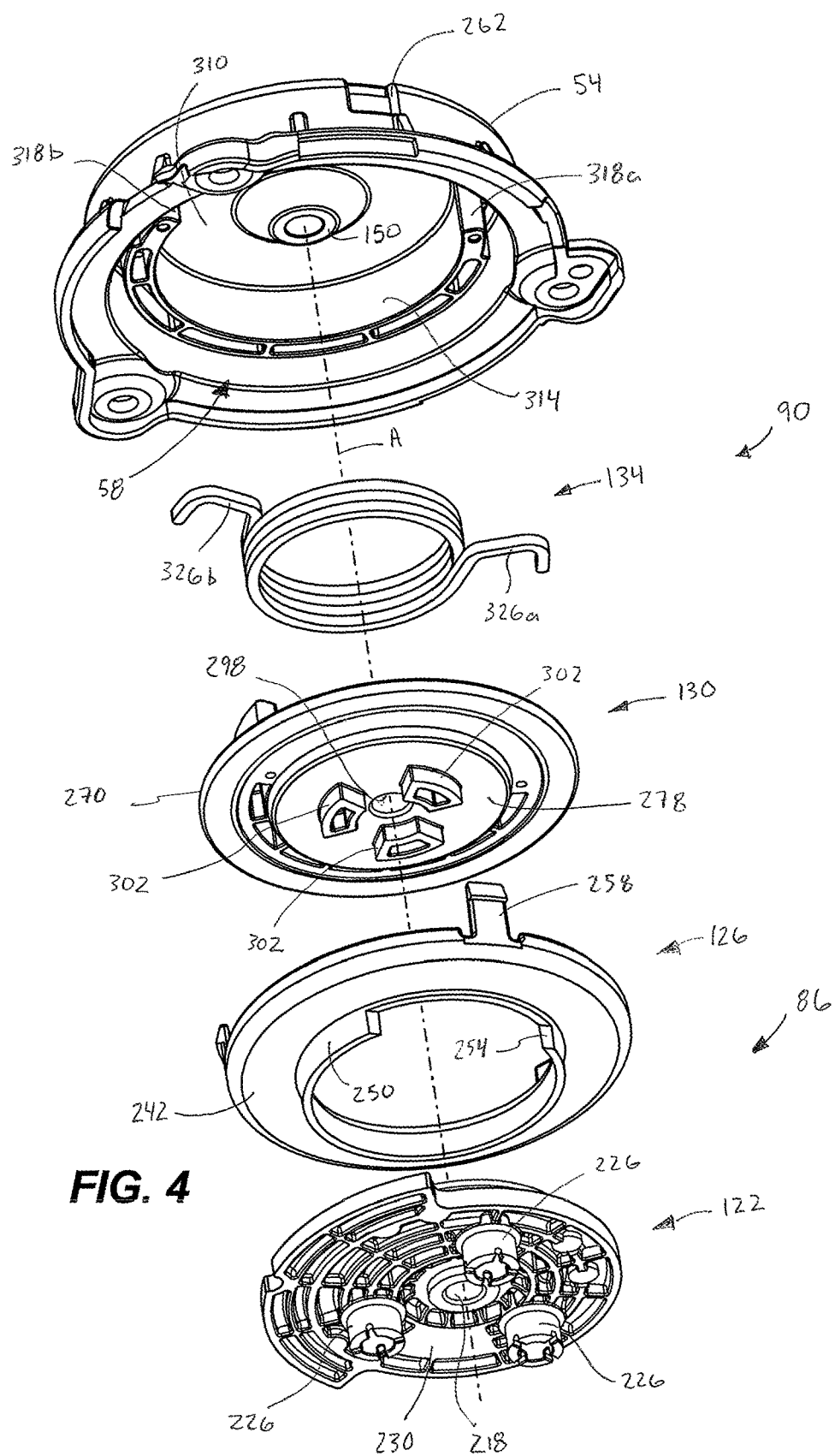
FIG. 4 is an exploded view of certain of the components of FIG. 3.

With reference to FIGS. 2-4, the actuator 10 includes a housing 50 having an upper housing portion 54 defining an upper recess 58 (FIG. 4) and a lower housing portion 62 defining a lower recess 66. The actuator 10 further includes a reversible motor 70 fixed to the lower housing portion 62 via a pair of motor fasteners 74. The motor 70 receives power when activated and is operable to selectively rotate in opposite first and second motor directions. The upper housing portion 54 and the lower housing portion 62 are coupled via housing fasteners 78 such that the housing 50 encloses a transmission including a gear assembly 82, a pulley assembly 86, and an auto-return assembly 90. The gear assembly 82 includes a worm screw 94, a worm gear 98, and a planetary gear set 102. The planetary gear set 102 includes a sun gear 106, three planetary gears 110, and a ring gear 114. The pulley assembly 86 includes a dual pulley 122 and a cable cover 126. The auto-return assembly 90 includes a spring carrier 130, and a torsion spring 134. In some embodiments, the torsion spring 134 may be one or more biasing members of another type (e.g., a compression spring). The actuator 10 further includes a support shaft 142 supported by hubs 146, 150 (FIGS. 3-4) on the upper housing portion 54 and the lower housing portion 62, respectively. The shaft 142 extends along a central axis A.

Each of the first and second cables 14a, 14b may be a Bowden cable including a respective inner cable 154a, 154b and an outer sheath 158a, 158b enclosing the inner cable 154a, 154b. The outer sheaths 158a, 158b are fixed to the housing 50 at one end of each outer sheath 158a, 158b at corresponding first and second cable openings 162a, 162b defined through the lower housing portion 62. In some embodiments, the first and second cable openings 162a, 162b may be defined by the upper housing portion 54 or a combination of the upper and lower housing portions 54, 62. The inner cables 154a, 154b are movable relative to the outer sheathes 158a, 158b for transmitting mechanical force.

With continued reference to FIGS. 2-3, the worm gear 98 is supported by the support shaft 142 for rotation thereon. The ring gear 114 has an outer periphery 170 configured to engage with a corresponding inner periphery 174 of the lower housing portion 62 within the lower recess 66 to prevent rotation of the ring gear 114 relative to the lower housing portion 62. In the illustrated embodiment the inner and outer peripheries 170, 174 include corresponding undulating ridges or a similar engagement, e.g., a toothed engagement. The ring gear 114 also includes a stop block 176 that is formed integrally with and extends upwardly from the ring gear 114. In some embodiments, the stop block 176 is formed as part of the housing 50.

Figure 5:
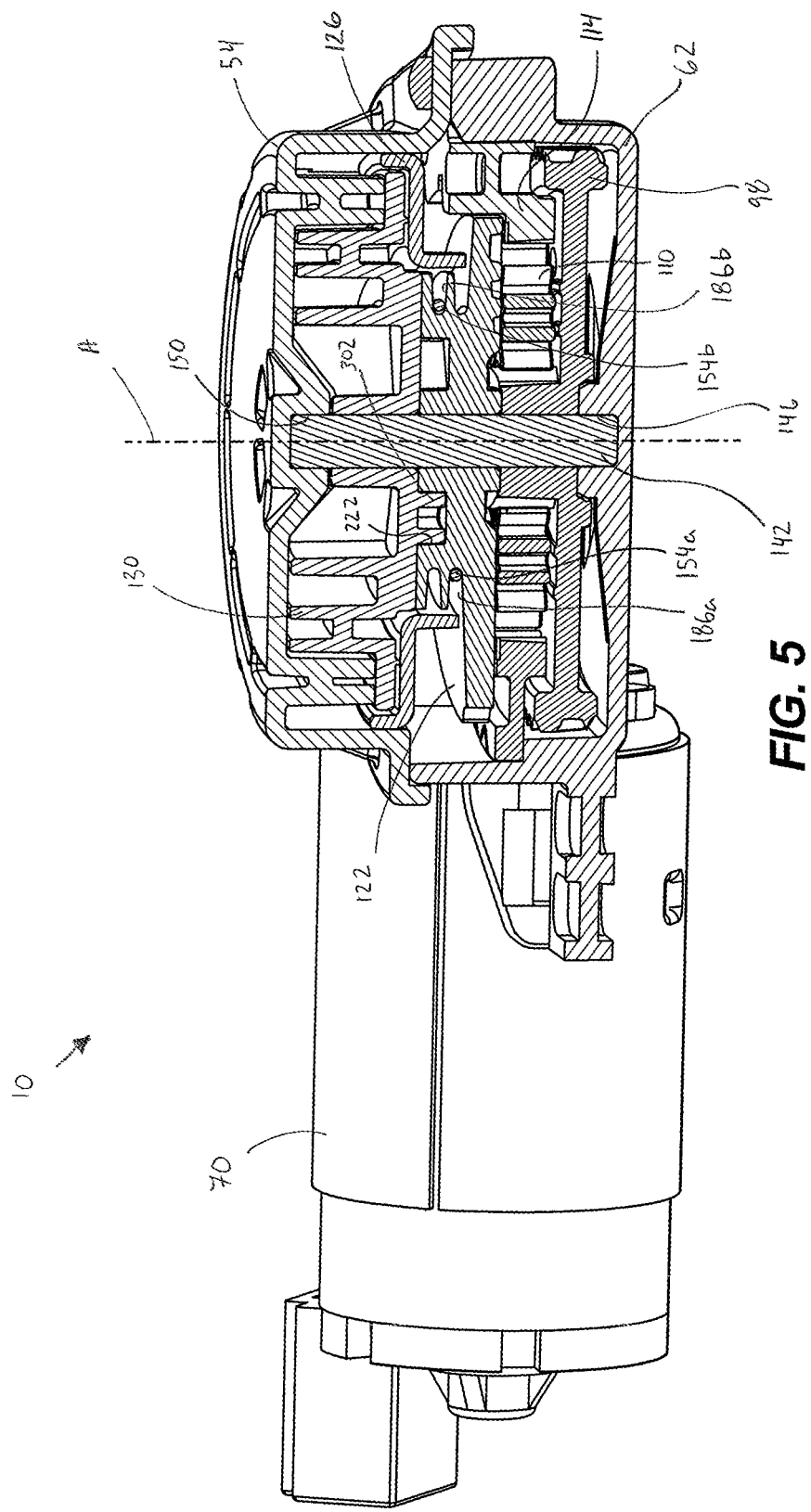
FIG. 5 is a cross-sectional view of the actuator of FIG. 1 taken along line 5-5 in FIG. 2.
Figure 6:
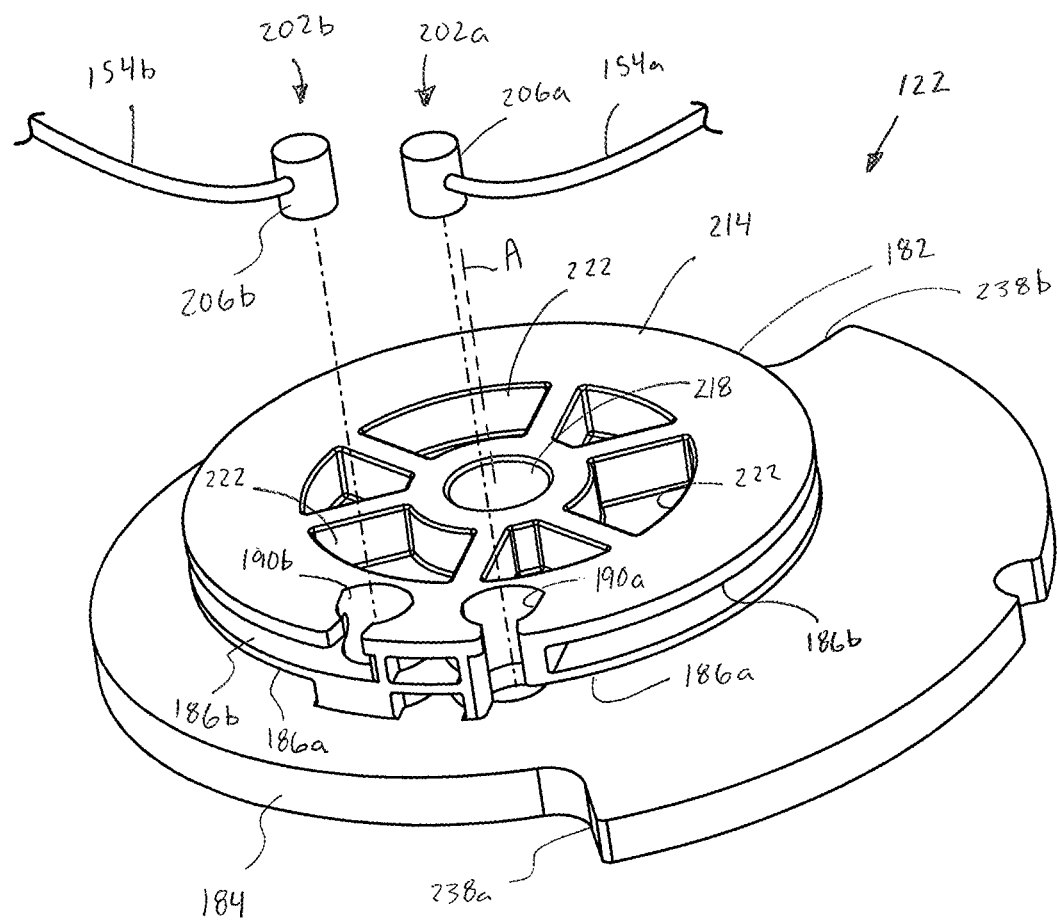
FIG. 6 is a perspective view of a pulley of the actuator of FIG. 1.

With reference to FIG. 6, the dual pulley 122 includes a cylindrical portion 182 extending from a base portion 184. The cylindrical portion 182 defines a first groove 186a and a second groove 186b. The first groove 186a extends from a first aperture 190a in a first direction circumferentially about the cylindrical portion 182. The second groove 186b extends from a second aperture 190b in a second, opposite direction circumferentially about the cylindrical portion 182. The first and second grooves 186a, 186b are spaced axially apart along the central axis A. Each of the inner cables 154a, 154b includes a lever end 198a, 198b (FIG. 1) and a pulley end 202a, 202b (FIG. 6). Each of the pulley ends 202a, 202b includes a barrel nipple 206a, 206b that is received in the respective first and second apertures 190a, 190b to couple the inner cables 154a, 154b to the pulley 122 (see also FIGS. 7-9). At least a portion of the inner cables 154a, 154b of the first and second cables 14a, 14b are receivable within the first and second grooves 186a, 186b, respectively (FIG. 5). The cylindrical portion 182 has an upper surface 214 and defines a central bore 218 extending through the pulley 122 along the central axis A, through which the support shaft 142 is received. A plurality of drive apertures 222 are defined in the upper surface 214 and spaced circumferentially about the central axis A. In the illustrated embodiment, there are three drive apertures 222, but in other embodiments there may be more or fewer drive apertures 222. Each of the drive apertures 222 has a curved-trapezoidal shape. In other embodiments, the drive apertures 222 may have another shape (e.g., circle, triangle, rectangle, etc.). The base portion 184 defines first and second circumferential stop surfaces 238a, 238b that are arranged to contact the stop block 174 to impede the pulley 122 from rotating about the axis A beyond a desired amount in either direction.

Figure 13:
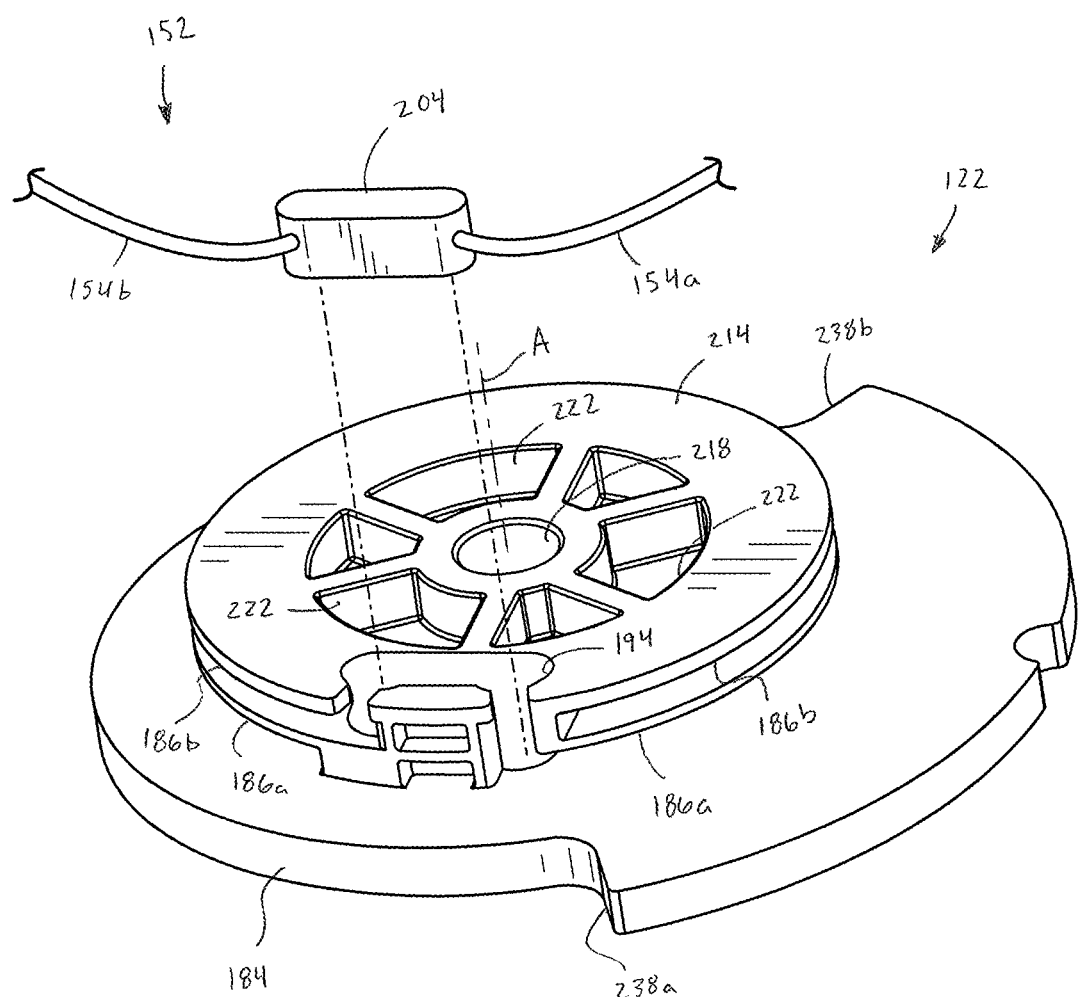
FIG. 13 is a perspective view of another pulley and single cable for use with the actuator of FIG. 1.
Figure 14:
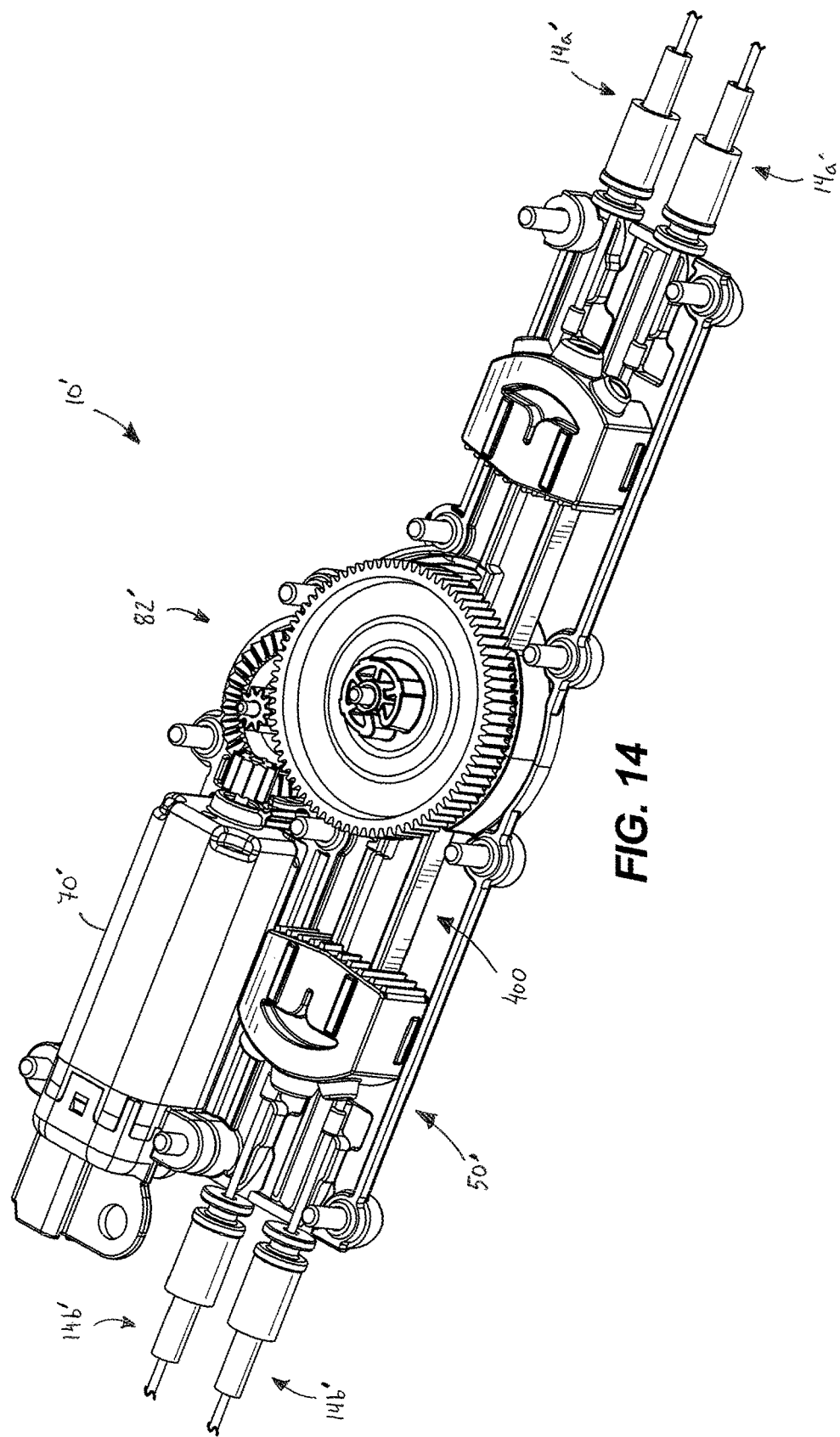
FIG. 14 is a perspective view of another actuator in accordance with another embodiment of the invention, showing a top housing cover and an auto-return assembly removed.

In alternative embodiments, for example as shown in FIG. 13, the inner cables 154a, 154b may be integrally formed together as a single cable 152. The barrel nipples 206a, 206b may also be formed as a single nut 204 positioned on the cable 152 to divide the cable 152 into two lengths. In such embodiments, the pulley 122 may also define a single aperture 194 that receives the nut 204, in lieu of the apertures 190a, 190b. In some embodiments, the pulley 122 may define a single groove extending circumferentially about the cylindrical portion 182, which at least partially receives a portion of the single cable 152 on either side of the nut 204.

With reference to FIG. 4, the dual pulley 122 includes a plurality of planetary projections 226 extending axially away from an underside or lower surface 230 of the pulley 122 and spaced circumferentially evenly about the central axis A. Each of the planetary projections 226 is received in an aperture 234 defined by each of the planetary gears 110. In some embodiments, there may be more or fewer planetary projections 226, depending on the number of planetary gears 110.

With continued reference to FIGS. 3-5, the cable cover 126 has an annular body 242 defining a central opening 246, and an arcuate wall 250 extending axially downward from the annular body 242 about the central opening 246. The arcuate wall 250 extends only partially around the central opening 246 so as to define a window 254. The central opening 246 receives the cylindrical portion 182 of the pulley 122, such that the arcuate wall 250 overlaps and covers the first and second grooves 186a, 186b along the length of the arcuate wall 250. The arcuate wall 250 retains the inner cables 154a, 154b within the first and second grooves 186a, 186b during operation. A plurality of flexible snap-fit prongs 258 extend upwardly from the annular body 242 and are spaced evenly about the axis A. The snap-fit prongs 258 engage with corresponding snap-fit apertures 262 defined by the upper housing portion 54 to fix the cable cover 126 relative to the housing 50. In the illustrated embodiment, there are three snap-fit prongs 258 and three snap-fit apertures 262. In some embodiments, there may be more or fewer snap-fit prongs 258 and snap-fit apertures 262.

Figure 10:
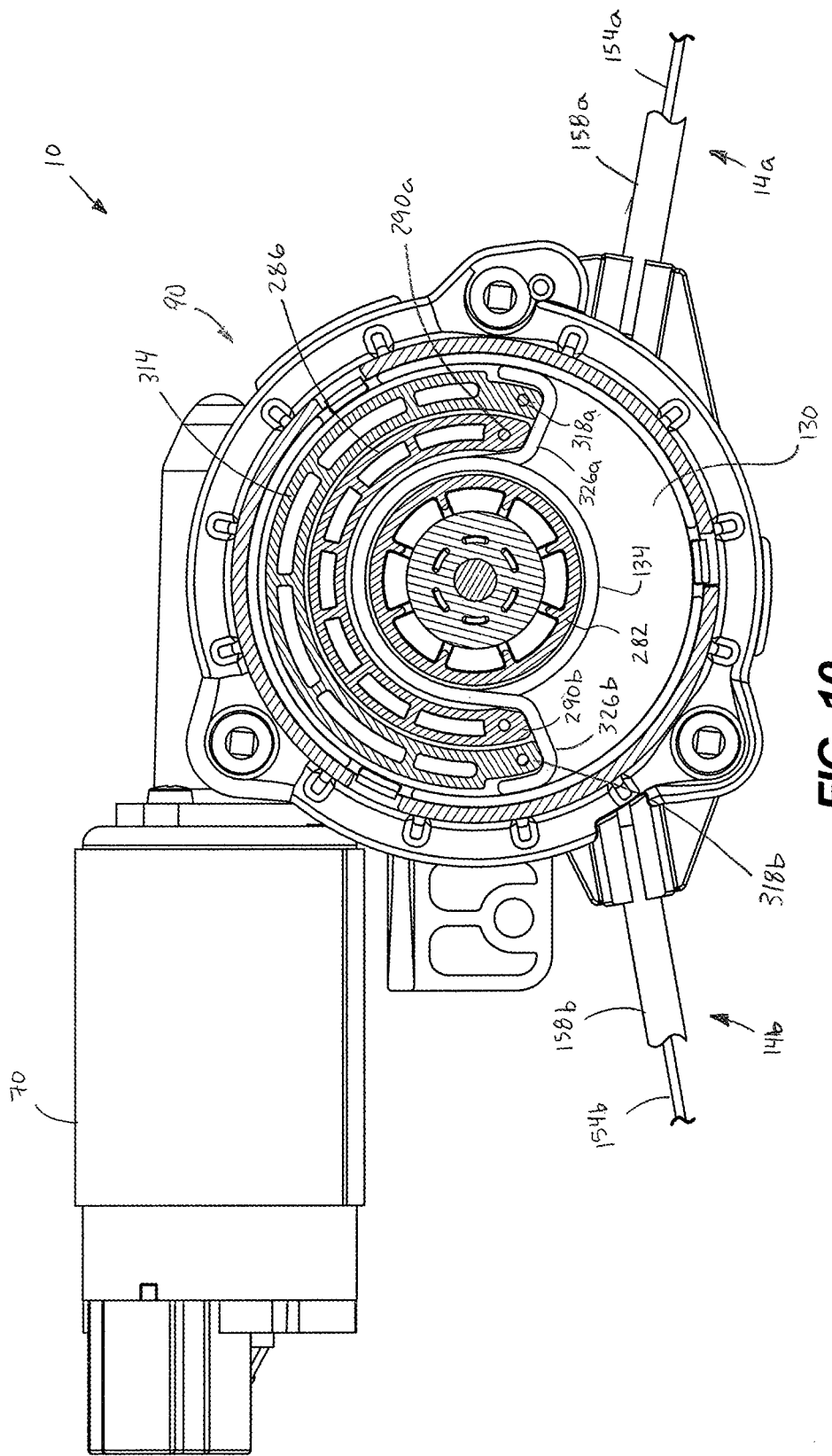
FIG. 10 is a cross-sectional view of the actuator of FIG. 1 taken along line 10-10 in FIG. 2 showing a spring carrier and a spring in a first position.

With continued reference to FIGS. 3-5, the spring carrier 130 of the auto-return assembly 90 includes a base 270. The base 270 is generally circular and planar, and has an upper surface 274 (FIG. 3) and a lower surface 278 (FIG. 4). A central projection 282 extends axially upwardly from the upper surface 274 of the base 270 and is concentric with the central axis A. A spring engaging projection 286 extends upwardly from the upper surface 274. The spring engaging projection 286 annularly extends from a first end 290a to a second end 290b concentric with the central axis A and is spaced radially outward from the central projection 282. The torsion spring 134 is positioned between a radial gap between the spring engaging projection 286 and the central projection 282. The spring engaging projection 286 sweeps an arc between approximately 180 degrees and approximately 270 degrees (e.g., approximately 225 degrees), as shown in FIG. 10. In some embodiments, the spring engaging projection 286 may sweep an arc greater than 270 degrees or less than 180 degrees. In some embodiments, the first and second ends 290a, 290b of the spring engaging projection 286 may be independent projections extending upwardly from the upper surface 274 of the base 270. A central bore 298 is defined through the spring carrier 130, through which the support shaft 142 is received.

The spring carrier 130 further includes a plurality of drive protrusions 302 extending axially downwardly from the lower surface 278 of the base 270. The drive protrusions 302 are spaced circumferentially about the central axis A. The drive protrusions 302 correspond to and engage the drive apertures 222 of the pulley 122 (FIG. 5). Each of the drive protrusions 302 has a curved-trapezoidal shape corresponding to the shape of the drive apertures 222. In other embodiments, the drive protrusions 302 may have another shape (e.g., circle, triangle, rectangle, etc.). In further embodiments, the spring carrier 130 and the pulley 122 are connected together to rotate together about the central axis A, for example, via fasteners, snap-fit connection, etc. In some embodiments, the spring carrier 130 and the pulley 122 are formed integrally as a single integral part.

With reference to FIG. 4, the auto-return assembly 90 further includes a spring support projection 314 extending downwardly from an inner surface 310 of the upper housing portion 54. The spring support projection 314 extends annularly from a first end 318a to a second end 318b. The spring support projection 314 has a center of curvature concentric with the central axis A and is spaced radially outward from the spring engaging projection 286 so as to receive the spring engaging projection 286 radially inward thereof. The spring support projection 314 sweeps an arc between approximately 180 degrees and approximately 270 degrees (e.g., approximately 225 degrees), as shown in FIG. 10. In some embodiments, the spring support projection 314 may sweep an arc greater than 270 degrees or less than 180 degrees. In the illustrated embodiment, the spring support projection 314 sweeps an arc approximately equal to the arc swept by the spring engaging projection 286. A first end 326a of the torsion spring 134 abuts and is supported on the first end 318a of the spring support projection 314, and a second end 326b of the torsion spring 134 abuts and is supported on the second end 318b of the spring support projection 314 (FIG. 10). In some embodiments, the first and second ends 318a, 318b of the spring support projection 314 may be independent projections extending upwardly from the inner surface 310 of the upper housing portion 54. In the illustrated embodiment, the torsion spring 134 is under compression and supported by both the first and second ends 318a, 318b of the spring support projection 314.

Referring back to FIG. 1, each of the first and second cables 14a, 14b includes a slack spring 330a, 330b. Each of the slack springs 330a, 330b is positioned between the respective lever end 198a, 198b of one of the inner cables 154a, 154b and a corresponding one of the first and second levers 18a, 18b. Each of the slack springs 330a, 330b is arranged to bias the lever end 198a, 198b of the inner cable 154a, 154b away from the outer sheath 158a, 158b to pull the inner cable 154a, 154b and remove any slack in the inner cables 154a, 154b to keep them taut.

With reference to FIG. 3, the worm screw 94 is directly coupled to an output shaft of the motor 70 and engages the worm gear 98 to be driven about the central axis A of the actuator 10. The worm screw 94 and the output shaft of the motor 70 are arranged to be in an axis transverse to the central axis A. In other embodiments, the worm screw 94 may be arranged parallel or coaxial to the central axis A. The motor 70 communicates (i.e., via a wired or wireless connection) with a controller (not shown) that in turn communicates with manual actuators (e.g., push-buttons, switches, etc.; not shown) that may be actuated by a user to selectively send signals to the motor 70 to control the motor direction of the output about the central axis A. The sun gear 106 is fixed to the worm gear 98 for rotation therewith. The planetary gears 110 are simultaneously engaged by the sun gear 106 to rotate about the axis A. The planetary projections 226 engage the planetary gears 110 such that the pulley 122 (and the pulley assembly 86 therewith) rotates about the central axis A via the planetary gears 110. When the motor 70 rotates the worm screw 94 in the first motor direction, the pulley 122 is rotated in a first actuation direction 338 (i.e., clockwise, as viewed from FIG. 8) about the central axis A from a home or neutral position (FIG. 7) to a first actuation position (FIG. 8) by the gear assembly 82. The pulley 122 is rotated in the first actuation direction 338 until the first circumferential stop surface 238a contacts the stop block 176 at the first actuation position. In the neutral position, neither of the first and second inner cables 154a, 154b is pulled to increase tension. In the first actuation position, the first inner cable 154a is pulled into the housing 50 so as to wrap around the pulley 122 within the first groove 186a and the second inner cable 154b is allowed to be released out of the housing 50 via the corresponding slack spring 330b to keep the second inner cable 154b taut. When the motor 70 rotates the worm screw 94 in the second motor direction, the pulley 122 is rotated in a second actuation direction 342 (i.e., counterclockwise, as viewed from FIG. 9) about the central axis A from the neutral position (FIG. 7) to a second actuation position (FIG. 9) by the gear assembly 82. The pulley 122 is rotated in the second actuation direction 342 until the second circumferential stop surface 238b contacts the stop block 176 at the second actuation position. In the second actuation position, the second inner cable 154b is pulled into the housing 50 so as to wrap around the pulley 122 within the second groove 186b and the first inner cable 154a is allowed to be released out of the housing 50 by expansion of the corresponding slack spring 330a to keep the first inner cable 154a taut.

Figure 11:
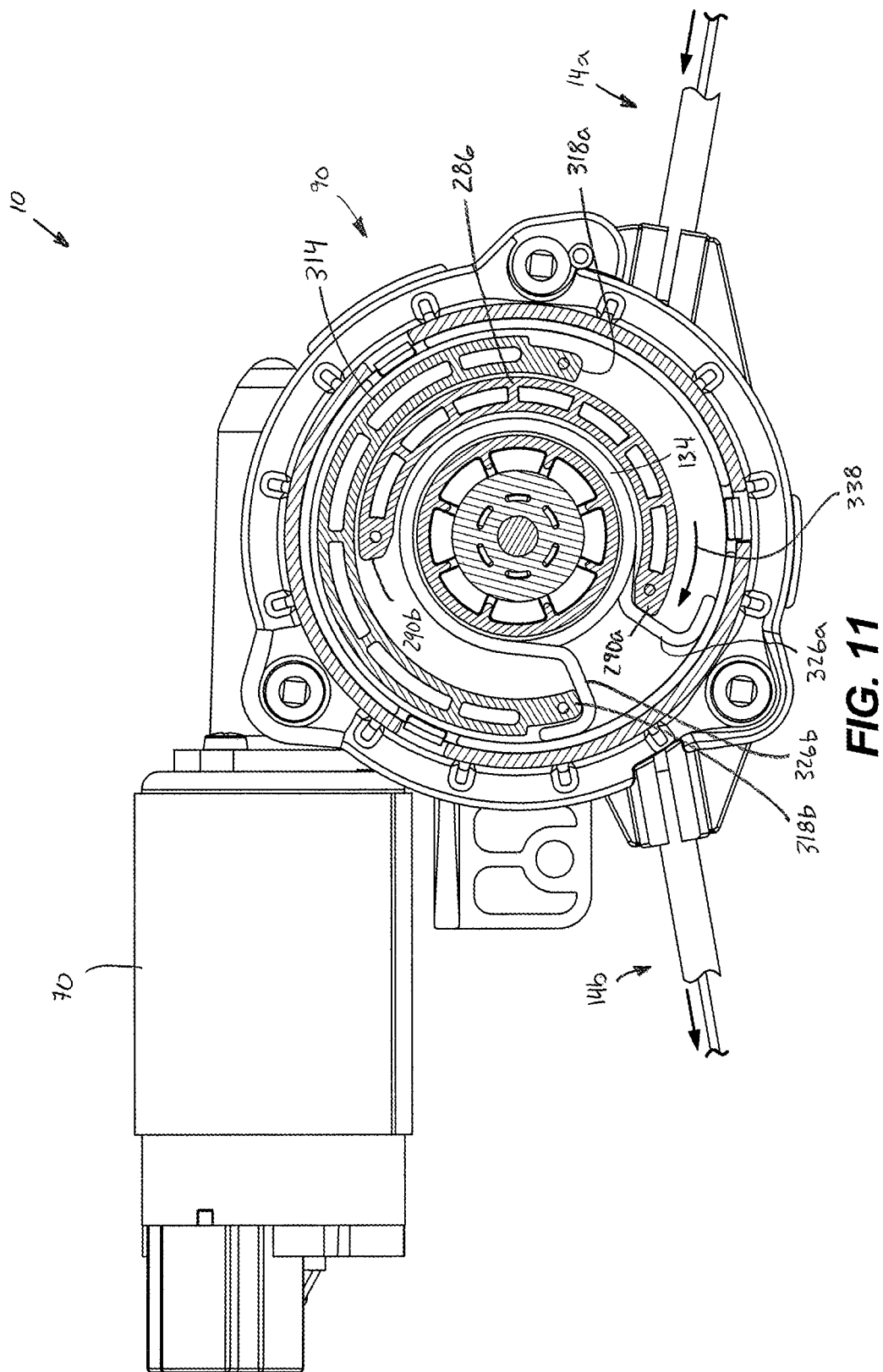
FIG. 11 is a cross-sectional view of the actuator of FIG. 1 taken along line 10-10 in FIG. 2 showing the spring carrier and the spring in a second position.
Figure 12:
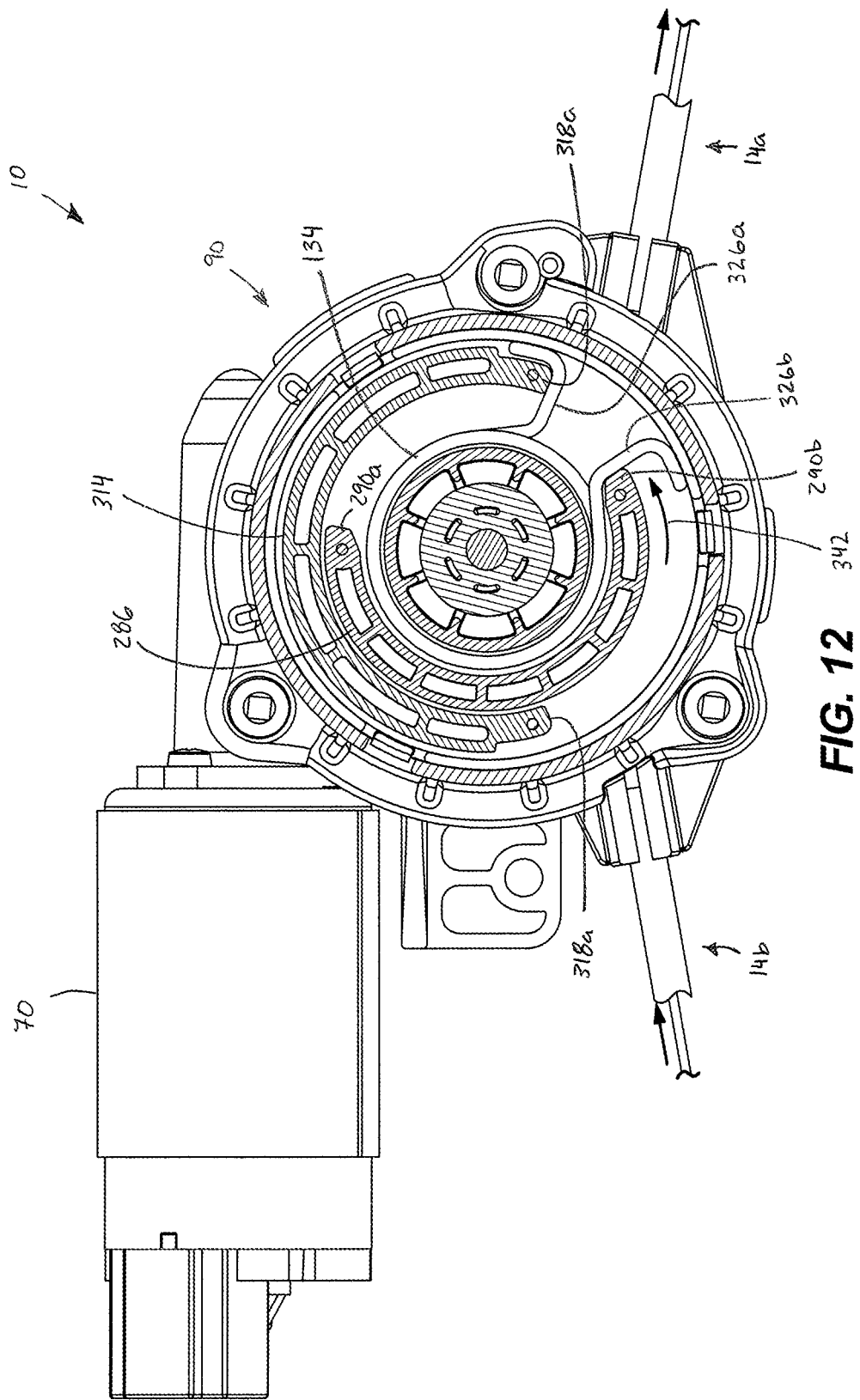
FIG. 12 is a cross-sectional view of the actuator of FIG. 1 taken along line 10-10 of FIG. 2 showing the spring carrier and the spring in a third position.

The drive apertures 222 of the pulley 122 are engaged by the drive protrusions 302 of the spring carrier 130 such that the spring carrier 130 is fixed for rotation with the pulley 122 between the neutral position (FIG. 10) and the first and second actuation positions (FIGS. 11-12). In other embodiments, the drive apertures 222 are defined by the spring carrier 130 and the drive protrusions 302 extend from the pulley 122.

The first and second ends 290a, 290b of the spring engaging projection 286 are aligned with the first and second ends 318a, 318b of the spring support projection 314, respectively, when in the neutral position (FIG. 10). As such, both the first and second ends 326a, 326b of the torsion spring 134 abut the first and second ends 318a, 318b of the spring support projection 314 and the first and second ends 290a, 290b of the spring engaging projection 286, respectively. When in the first actuation position (FIG. 11), the first end 290a of the spring engaging projection 284 engages the first end 326a of the torsion spring 134 to compress the torsion spring 134 by an angular amount in the first actuation direction (i.e., clockwise, as viewed from FIG. 11). The second end 326b of the torsion spring 134 abuts and is supported by the second end 318b of the spring support projection 314. When in the second actuation position (FIG. 12), the second end 290b of the spring engaging projection 286 engages the second end 326b of the torsion spring 134 to compress the torsion spring 134 by an angular amount in the second actuation direction (i.e., counterclockwise, as viewed from FIG. 12). The first end 326a of the torsion spring 134 abuts and is supported by the first end 326a of the spring support projection 314. The torsion spring 134 may be compressed in either direction by an angular amount between approximately 60 degrees and approximately 170 degrees (e.g., approximately 115 degrees). In other embodiments, the torsion spring may be arranged to be angularly compressed by less than 60 degrees or more than 170 degrees. In some embodiments, the spring carrier 130 may be rotated by any angular amount relative to the neutral position such that the torsion spring 134 may be compressed by any corresponding angular amount.

The torsion spring 134 provides a biasing force acting on the spring carrier 130 in the direction opposite of compression towards the neutral position, when compressed into either the first actuation position or the second actuation position. Accordingly, the auto-return assembly 90 is always acting to return the transmission back to the neutral position.

In particular, when compressed into or toward the first actuation position (i.e., the first end 326a of the torsion spring 134 is moved in the first actuation direction 338 while the second end 326b of the torsion spring 134 is stopped by the second end 318b of the spring support projection 314), the torsion spring 134 applies a biasing force on the spring carrier 130 in the second actuation direction 342 (i.e., counterclockwise, as viewed from FIG. 12) back toward the neutral position. When compressed toward and into the second actuation position (i.e., the second end 326b of the torsion spring 134 is moved in the second actuation direction 342 while the first end 326a of the torsion spring 134 is stopped by the first end 318a of the spring support projection 314), the torsion spring 134 applies a biasing force on the spring carrier in the first actuation direction 338 (i.e., clockwise, as viewed from FIG. 11) back toward the neutral position. These biasing forces drive the pulley 122 back toward and into the neutral position once the motor 70 is disengaged or deactivated.

Figure 7:
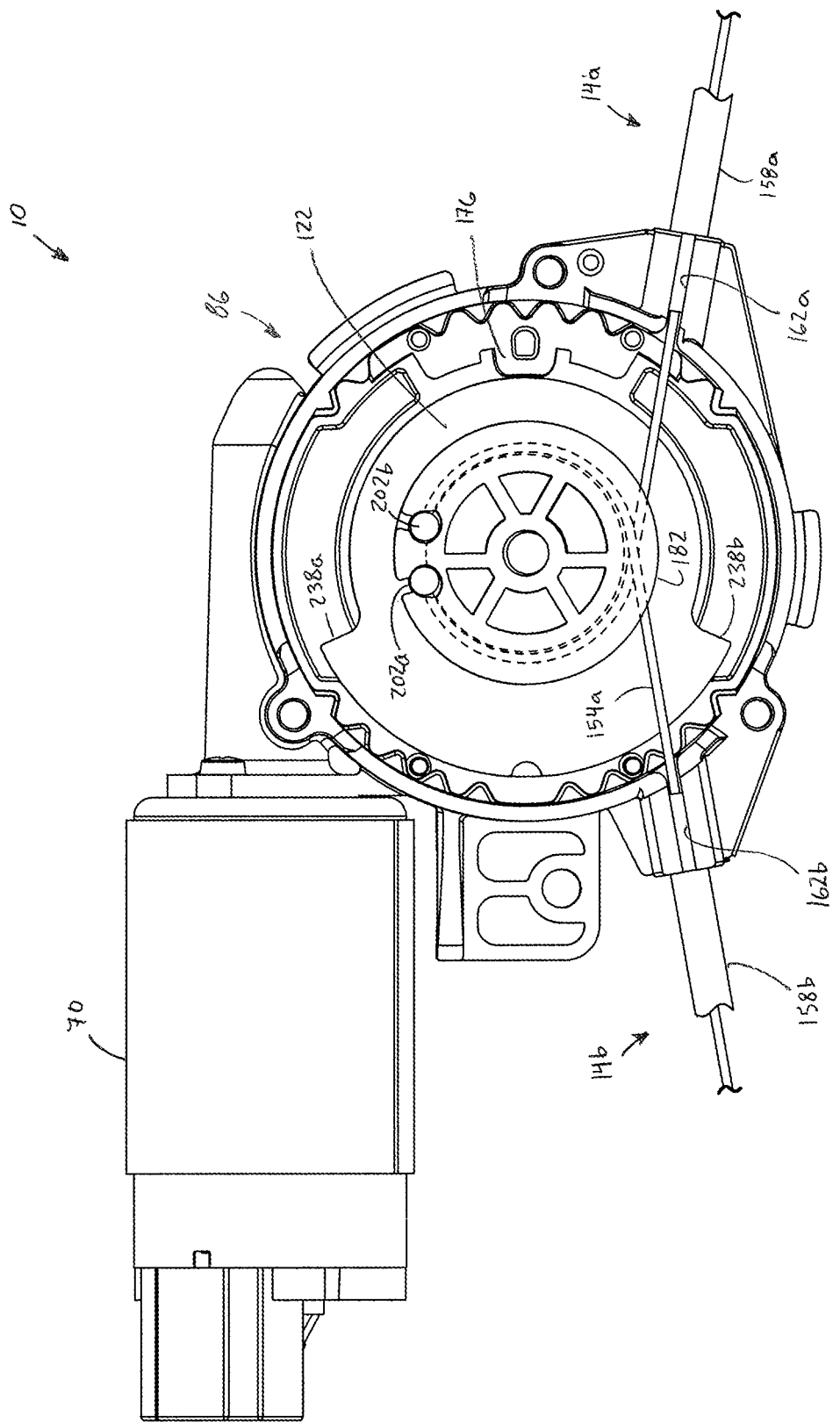
FIG. 7 is top planar view of the actuator of FIG. 1 showing a top housing cover, a spring carrier, and a cable cover removed and the pulley in a first position.
Figure 8:
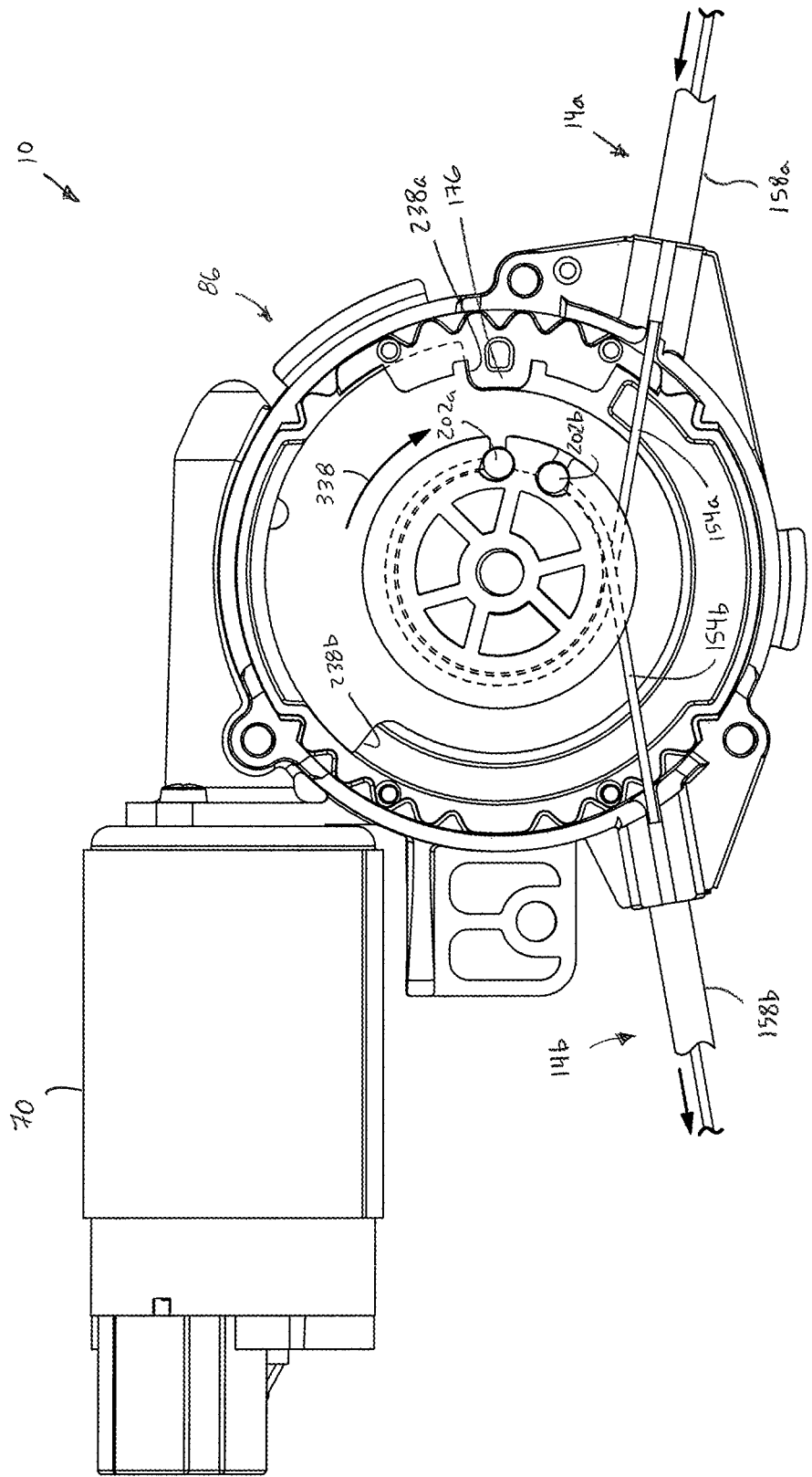
FIG. 8 is a top planar view of the actuator of FIG. 1 showing the top housing cover, the spring carrier, and the cable cover removed and the pulley in a second position.
Figure 9:
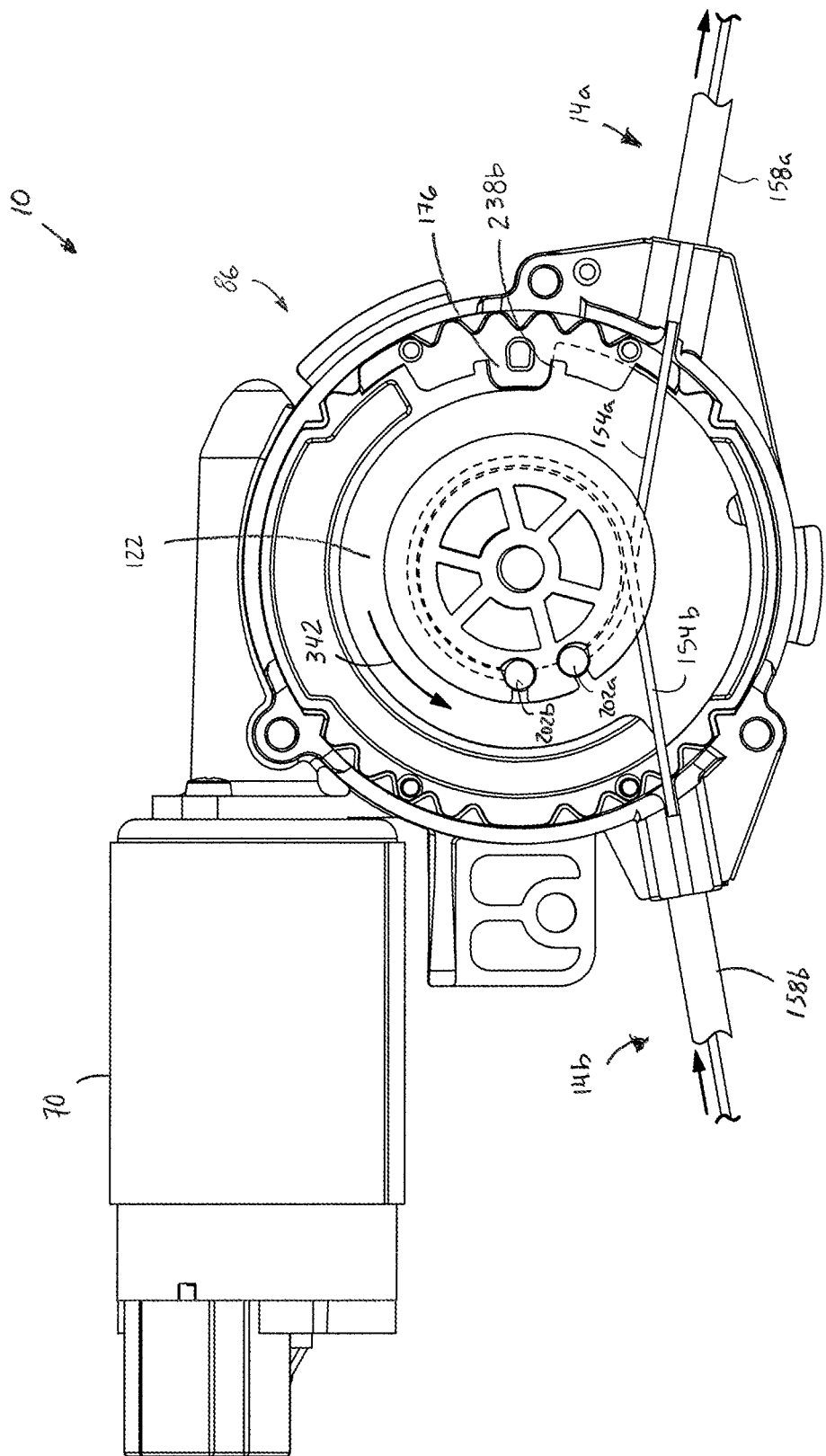
FIG. 9 is a top planar view of the actuator of FIG. 1 showing the top housing cover, the spring carrier, and the cable cover removed and the pulley in a third position.

During assembly of the actuator 10, the worm screw 94 is directly coupled to the output of the motor 70. The worm screw 94 is then inserted into the lower housing portion 62 and the motor 70 is fixed to the lower housing portion 62 via the motor fasteners 74. The support shaft 142 is then inserted into the hub 146 within the lower recess 66 of the lower housing portion 62. The worm gear 98 is axially inserted over the support shaft 142 into the lower recess 66 of the lower housing portion 62 such that the teeth of the worm gear 98 engage with the teeth of the worm screw 94. The ring gear 114 is axially inserted into the lower recess 66 such that the outer periphery 170 of the ring gear 114 engages the corresponding inner periphery 174 of the lower housing portion 62 within the lower recess 66 to inhibit rotation of the ring gear 114 relative to the housing 50. The planetary gears 110 are then snapped onto the planetary projections 226 of the pulley 122 (FIG. 5). The pulley 122 is then axially inserted into the lower recess 66 such that the planetary gears 110 engage the ring gear 114 and the sun gear 106 about the central axis A. The support shaft 142 is received in the central bore 218 of the pulley 122 to rotationally support the pulley 122 about the central axis A. The barrel nipples 206a, 206b of the pulley ends 202a, 202b of the inner cables 154a, 154b of the first and second cables 14a, 14b are then each inserted into the respective first and second apertures 190a, 190b of the pulley 122, as best shown in FIGS. 7-9. The inner cables 154a, 154b are then fed out the first and second cable openings 162a, 162b and the end of the outer sheaths 158a, 158b are coupled to the lower housing portion 62 within the first and second cable openings 162a, 162b, as best shown in FIGS. 7-9.

The torsion spring 134 is then positioned over the central projection 282 and supported on the base 270 of the spring carrier 130 such that the first and second ends 326a, 326b of the torsion spring 134 are arranged to abut and circumferentially support the first and second ends 290a, 290b of the spring engaging projection 286, respectively. The torsion spring 134 may be completely relaxed or alternatively put under slight compression when supported by the spring engaging projection. The spring carrier 130 and the torsion spring 134 are then inserted into the upper recess 58 of the upper housing portion 54 such that the spring engaging projection 286 is radially inward of the spring support projection 314 (i.e., the central bore 298 of the spring carrier 130 is axially aligned with the hub 150 of the upper housing portion 54 along the central axis A). The first and second ends 318a, 318b of the spring support projection 314 are also aligned with the first and second ends 290a, 290b of the spring engagement projection 286 to support the first and second ends 326a, 326b of the torsion spring 134. The cable cover 126 is then inserted into the upper recess 58 of the upper housing portion 54 such that the snap-fit prongs 258 engage the snap-fit apertures 262 of the upper housing portion 54 to secure the cable cover 126 to the upper housing 50 and retain the spring carrier 130 within the upper recess 58. The annular body 242 of the cable cover 126 contacts the lower surface 278 of the base 270 of the spring carrier 130 and the drive protrusions 302 extend through the opening 246 in the cable cover 126.

The upper housing portion 54 and the lower housing portion 62 are then brought together to enclose the transmission (i.e., the gear assembly 82 and the pulley assembly 86), and are coupled by the housing fasteners 78. The central bore 298 of the spring carrier 130 and the hub 150 of the upper housing portion 54 axially receive the support shaft 142. The central projection of the pulley 122 is also received within the opening 246 of the cable cover 126 such that the first and second grooves 186a, 186b are partially covered circumferentially by the arcuate wall 250 to retain the first and second inner cables 154a, 154b within the respective first and second grooves 186a, 186b. The drive protrusions 302 of the spring carrier 130 are also received in the respective drive apertures 222 of the pulley 122 so that the spring carrier 130 and the pulley 122 rotate together on the support shaft 142 about the central axis A.

In operation of the actuator 10, in order to actuate the first release latch mechanism 22a to allow the seat 26 to be moved laterally (i.e., forward or backward), a user activates or energizes the motor 70 to rotate the output in the first motor direction. The worm screw 94 engages the worm gear 98 to drive the worm gear 98 and the sun gear 106 in the first actuation direction 338 about the central axis A. The sun gear 106 engages the planetary gears 110 to rotate the planetary gears 110 in the first actuation direction 338 about the central axis A. Since the planetary projections 226 engage the planetary gears 110, the pulley 122 is rotated in the first actuation direction 338 about the central axis A from the neutral position (FIG. 7) toward the first actuation position (FIG. 8). As the pulley 122 rotates toward the first actuation position, a length of the first inner cable 154a is pulled into the housing 50 and wrapped around the cylindrical portion 182 of the pulley 122 within the first groove 186a in the first actuation direction 338 until the first circumferential surface 238a contacts the stop block 176. This increases tension in the first inner cable 154a causing the first inner cable 154a to actuate the first lever 18a of the first release latch mechanism 22a to release the corresponding latch, allowing the seat 26 to be manually moved along the lateral direction 42 either forward or backward (FIG. 1). In some embodiments, the seat 26 may be automatically moved as the second release latch mechanism 22b is actuated. In addition, as the pulley 122 rotates toward the first actuation position, a length of the inner cable 154b of the second cable 14b is unwound from the second groove 186b of the cylindrical portion 182, producing slack in the inner cable 154b. The slack spring 330b of the second cable 14b biases the lever end 198b of the second inner cable 154b away from the sheath 158b to reduce slack and keep the second inner cable 154b taut.

As the pulley 122 rotates in the first actuation direction 338 toward the first actuation position, the spring carrier 130 is simultaneously rotated in the first actuation direction 338 about the axis A from the neutral position (FIG. 10) toward the first actuation position (FIG. 11). This causes the first end 326a of the torsion spring 134 to be engaged by the first end 290a of the spring engaging projection 286 of the torsion spring carrier 130 to compress the first end 326a of the torsion spring 134 toward the second end 326b by an angular amount corresponding to the angular rotation of the pulley 122 into the first actuation position. When the motor 70 is deactivated or deenergized after the first lever 18a is actuated, the torsion spring 134 biases the spring carrier 130 in reverse to the first actuation direction 338 (i.e., the second actuation direction 342) back into the neutral position (FIG. 10). The torsion spring 134 is arranged under compression in the neutral position, such that the first end 326a of the torsion spring 134 is stopped from further expansion by the first end 318a of the spring support projection 314. The pulley 122 is driven by the drive protrusions 302 of the spring carrier 130 back into the neutral position (FIG. 7). The output of the motor 70 freely rotates in the second motor direction via the gear assembly 82 being driven in reverse.

Similarly, in order to actuate the second release latch mechanism 22b to allow the upper seat portion 30 to be folded toward or away from the lower seat portion 34, a user activates or energizes the motor 70 to rotate the output in the second motor direction. The worm screw 94 engages the worm gear 98 to drive the worm gear 98 and the sun gear 106 in the second actuation direction 342 about the central axis A. The sun gear 106 engages the planetary gears 110 to rotate the planetary gears 110 in the second actuation direction 342 about the central axis A. Since the planetary projections 226 of the pulley 122 engage the planetary gears 110, the pulley 122 is rotated in the second actuation direction 342 about the central axis A from the neutral position (FIG. 7) toward the second actuation position (FIG. 9). As the pulley 122 rotates toward the second actuation position, a length of the second inner cable 154b is pulled into the housing 50 and wrapped around the cylindrical portion 182 of the pulley 122 within the second groove 186b in the second actuation direction 342. This increases tension in the second inner cable 154b causing the second inner cable 154b to actuate the second lever 18b of the second release latch mechanism 22b to release the corresponding latch, allowing the upper seat portion 30 to be folded toward or away from the lower seat portion 34 (FIG. 1). In some embodiments, the upper seat portion 30 may be automatically folded as the first release latch mechanism 22a is actuated. In addition, as the pulley 122 rotates toward the second actuation position, a length of the first inner cable 154a is unwound from the first groove 186a of the pulley 122 producing slack in the first inner cable 15a. The slack spring 330a of the first cable 14a biases the lever end 198a of the first inner cable 154a away from the sheath 158a to reduce slack and keep the first inner cable 154a taut.

As the pulley 122 rotates toward the second actuation position, the spring carrier 130 is simultaneously rotated in the second actuation direction 342 about the axis A from the neutral position (FIG. 10) toward the second actuation position (FIG. 12). This causes the second end 326b of the torsion spring 134 to be engaged by the second end 290b of the spring engaging projection 286 of the torsion spring carrier 130 to compress the second end 326b of the torsion spring 134 toward the first end 326a of the torsion spring 134 by an angular amount directly corresponding to the angular rotation of the pulley 122 into the second actuation position. When the motor 70 is deactivated or deenergized after the second lever 18b is actuated, the torsion spring 134 biases the spring carrier 130 in reverse to the second actuation direction 342 (i.e., the first actuation direction 338) back into the neutral position (FIG. 10). Because the torsion spring 134 is arranged under compression in the neutral position, the second end 326b of the torsion spring 134 is stopped from further expansion by the second end 318b of the spring support projection 314. The pulley 122 is driven by the drive protrusions 302 of the spring carrier 130 back into the neutral position (FIG. 7). The output of the motor 70 freely rotates in the first motor direction via the gear assembly 82 being driven in reverse.

Thus, the disclosure describes, among other things, an actuator 10 including a motor 70 and a pulley 122 connected with two separate cables 14a, 14b that are connected to respective first and second levers 18a, 18b of first and second release latch mechanisms 22a, 22b. The pulley 122 may be driven in opposite directions to actuate one or the other of the levers 18a, 18b to perform a corresponding seat movement action. The actuator 10 may further include at least one biasing member 134 to automatically move the pulley back into a neutral position after actuation. Accordingly, the actuator 10 reduces the total number of actuators needed to perform multiple different movement actions. This, in turn, reduces the total number of components required, and reduces cost, weight, and space required.

FIGS. 14-18 illustrate a dual actuator 10' according to another embodiment of the invention. The illustrated dual actuator 10' in FIGS. 14-18 includes similar structure and has a similar manner of operation as the dual actuator 10 illustrated in FIGS. 1-12. Common functional elements have been given the same reference numbers plus an added prime (') symbol. Accordingly, only differences in structure and manner of operation of the dual actuator 10' are described in detail below. As described in more detail below, the dual actuator 10' of FIGS. 14-18 differs from the actuator 10 of FIGS. 1-12 in that the transmission includes a different gear assembly 82', and the pulley assembly 86 is replaced with a rack assembly 400 arranged to actuate first and second cables 14a', 14b' when a motor 70' is driven in opposite directions. Although not shown, the dual actuator 10' of FIGS. 14-18 includes an auto-return assembly that operates similarly to the auto-return assembly 90 of FIGS. 1-12.

Figure 15:
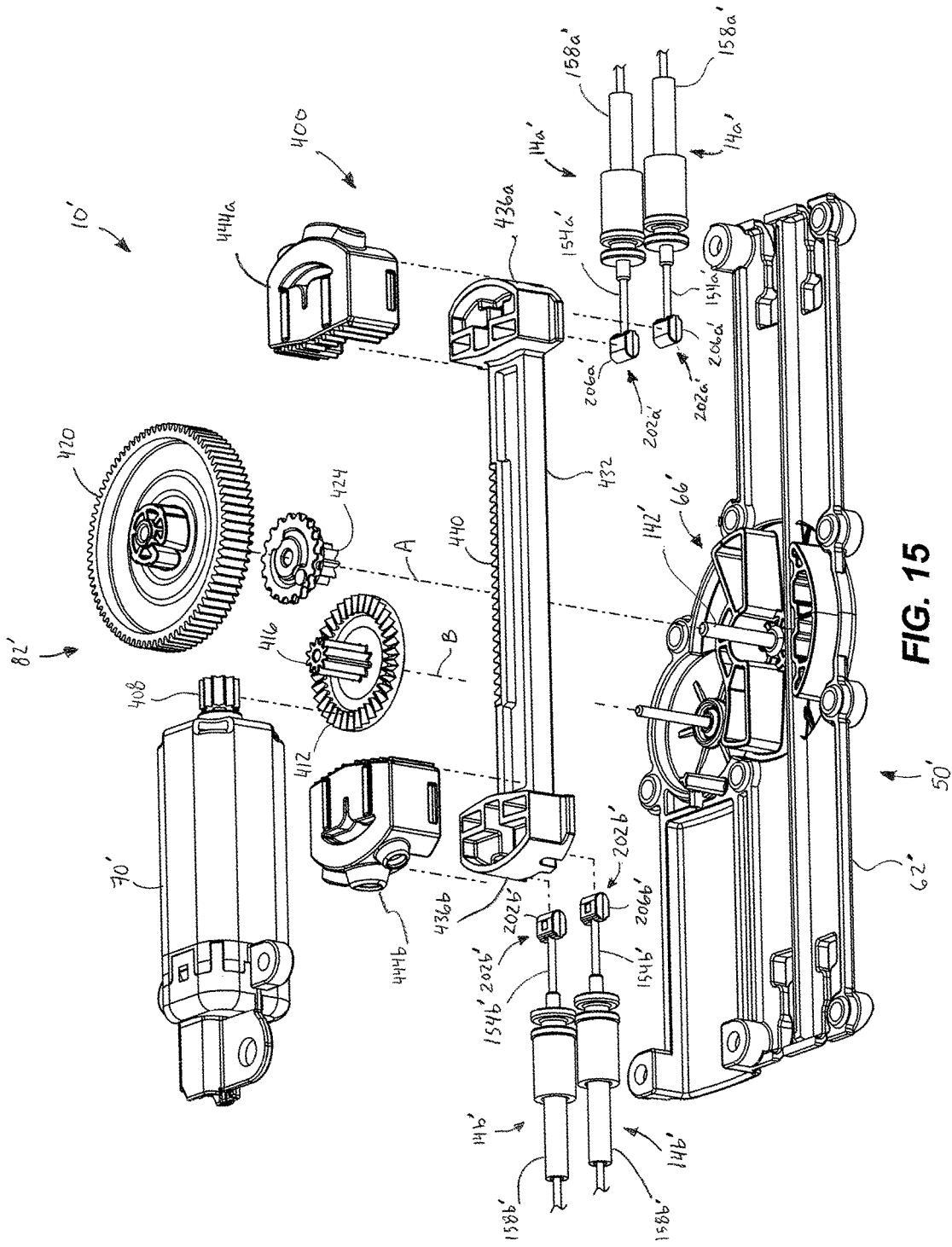
FIG. 15 is an exploded view of the actuator of FIG. 14.
Figure 16:
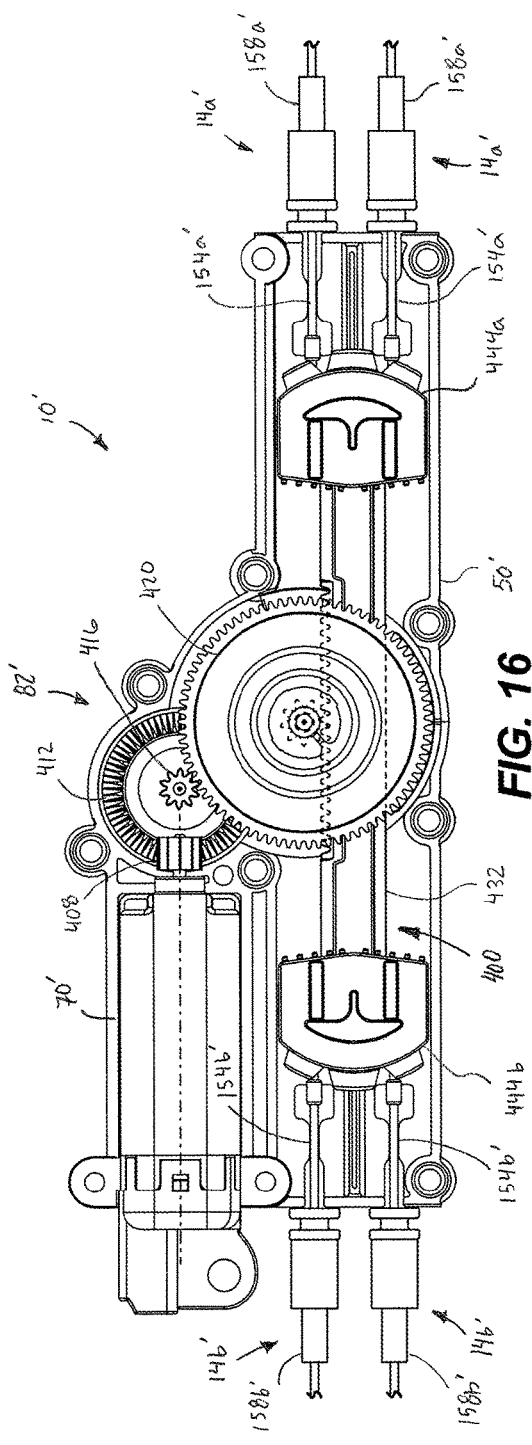
FIG. 16 is a top planar view of the actuator of FIG. 14 showing a rack assembly in a first position.

With reference to FIG. 15, the gear assembly 82' includes a first pinion 408, a bevel gear 4012, a second pinion 416, a main gear 420, and a third pinion 424. The first pinion 408 is directly driven by the output of the motor 70'. The first pinion 408 drivingly engages the bevel gear 412 about an axis B of the bevel gear 412. The second pinion 416 is fixed to the bevel gear 412 to rotate about the axis B of the bevel gear 412 therewith. The second pinion 416 drivingly engages the main gear 420 for rotation on the support shaft 142' about the central axis A thereof. The third pinion 424 extends from a bottom surface of the main gear 420 and rotates with the main gear 420 about the central axis A on the shaft 142'. Depending on the selected drive direction of the motor 70' the main gear 420 and the third pinion 424 may be rotated in either direction about the central axis A.

The rack assembly 400 includes a rack 432 having first and second ends 436a, 436b, and teeth 440 defined along a side of the rack 432. The rack assembly 400 is movable within the housing 50' from a neutral position (FIG. 16) to a first actuation position (FIG. 17) and a second actuation position (FIG. 18). The third pinion 424 drivingly engages the teeth 440 of the rack 432 to move the rack 432 linearly within the housing 50' between the different positions. Each of the first and second ends 436a, 436b supports a bumper 444a, 444b. The bumpers 444a, 444b are provided to prevent damage between the rack 432 and the housing 50', as the rack assembly 400 moves to each of the first and second actuation positions. The bumpers 444a, 444b may be made at least partially of a soft polymeric material (e.g., rubber) to help absorb impacts.

The inner cables 154a' of a pair of first cables 14a' are each connected at their first ends 202a' to the first end 436a of the rack 432. The inner cables 154b' of a pair of second cables 14b' are each connected at their first ends 202b' to the second end 436b of the rack 432. The outer sheaths 158a', 158b' of both pairs of first and second cables 14a', 14b' are fixed to the housing 50'. In alternative embodiments, only one of the cables of each of the pair of first cables 14a' and the pair of second cables 14b' may be connected at the corresponding one of the first and second ends 436a, 436b of the rack 432. In such embodiments, each of the first and second cables 14a', 14b' may be used to actuate corresponding release levers such as the actuator 10 of FIGS. 1-12.

Although not shown, an auto-return assembly similar to the auto-return assembly 90 of FIGS. 1-12 is provided for returning the transmission, and in particular, the rack assembly 400 to the neutral position (FIG. 16) from the first and second actuation positions (FIGS. 17-18) when the motor 70' is deactivated. For example, a spring carrier may be drivingly engaged with the main gear 420 for rotation therewith and may support a torsion spring in the same manner as previously described and shown in FIGS. 3-5 in which the spring carrier 130 is drivingly engaged with the pulley 122 and the torsion spring 134 is supported by the spring carrier 130. The torsion spring may be stopped at first and second ends by corresponding first and second ends of a spring support projection extending downward from an upper housing portion of the housing 50' in the same manner as previously described and shown in FIGS. 10-12 in which the first and second ends 326a, 326b of the torsion spring 134 are supported by the first and second ends 318a, 318b of the spring support projection 314. The spring carrier may also include a spring engaging projection having first and second ends configured to engage the first and second ends of the torsion spring to compress the torsion spring as the main gear 420 rotates to either of the first and second actuation positions in the same manner as previously described and shown in FIGS. 10-12 in which the first and second ends 318a, 318b of the spring engaging projection 286 engage the first and second ends 326a, 326b of the torsion spring 134 to compress the torsion spring 134 as the spring carrier 130 and the pulley 122 rotate to the first and second actuation positions. While under compression, the torsion spring provides a biasing force acting on the spring carrier to drive the main gear 420 and the rack assembly 400 back to the neutral position (FIG. 16), as was the case with the spring carrier 130 and the pulley 122 which are biased back to the neutral position (FIG. 10) from the first and second actuation positions (FIGS. 11-12) by the torsion spring 134 as previously described.

In operation, the actuator 10' may be used to actuate the first release latch mechanism 22a with at least one of the first cables 14a' when the motor 70' is driven in a first motor direction, and actuate the second release latch mechanism 22b with at least one of the second cables 14b' when the motor 70' is driven in a second motor direction, similar to the actuator 10 of FIGS. 1-12. Alternatively, each of the first cables 14a' may simultaneously actuate different mechanisms when the motor 70' is driven in a first motor direction, while each of the second cables 14b' may simultaneously actuate different mechanisms when the motor 70' is driven in the second motor direction.

Figure 17:
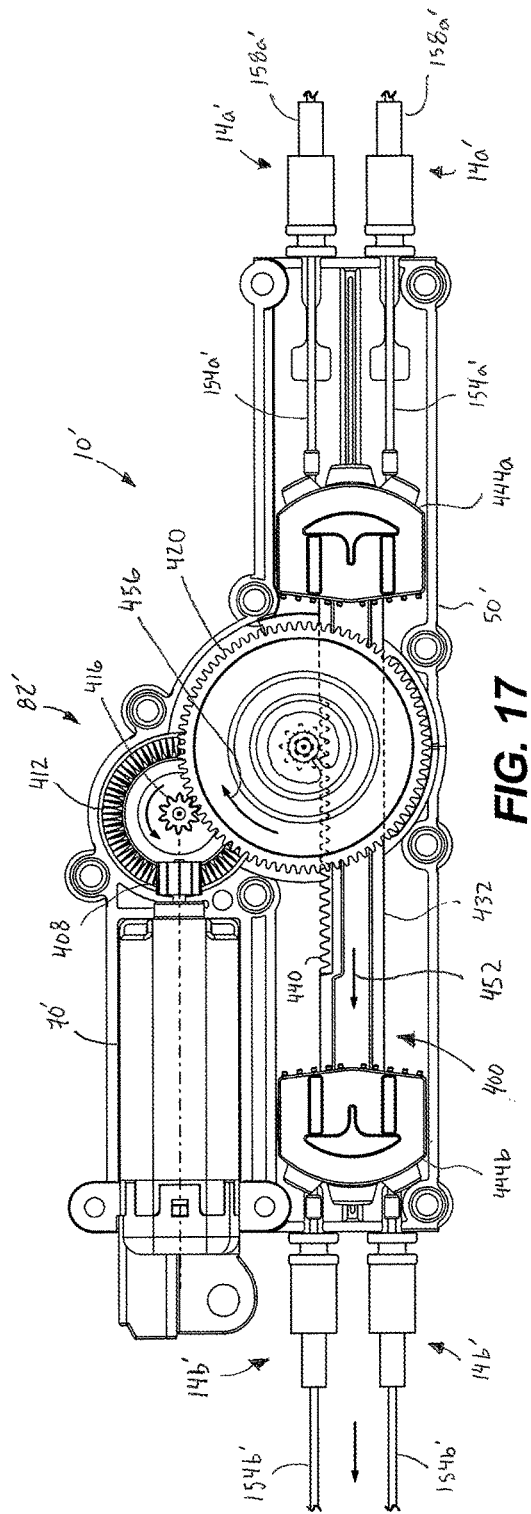
FIG. 17 is a top planar view of the actuator of FIG. 14 showing the rack assembly in a second position.
Figure 18:
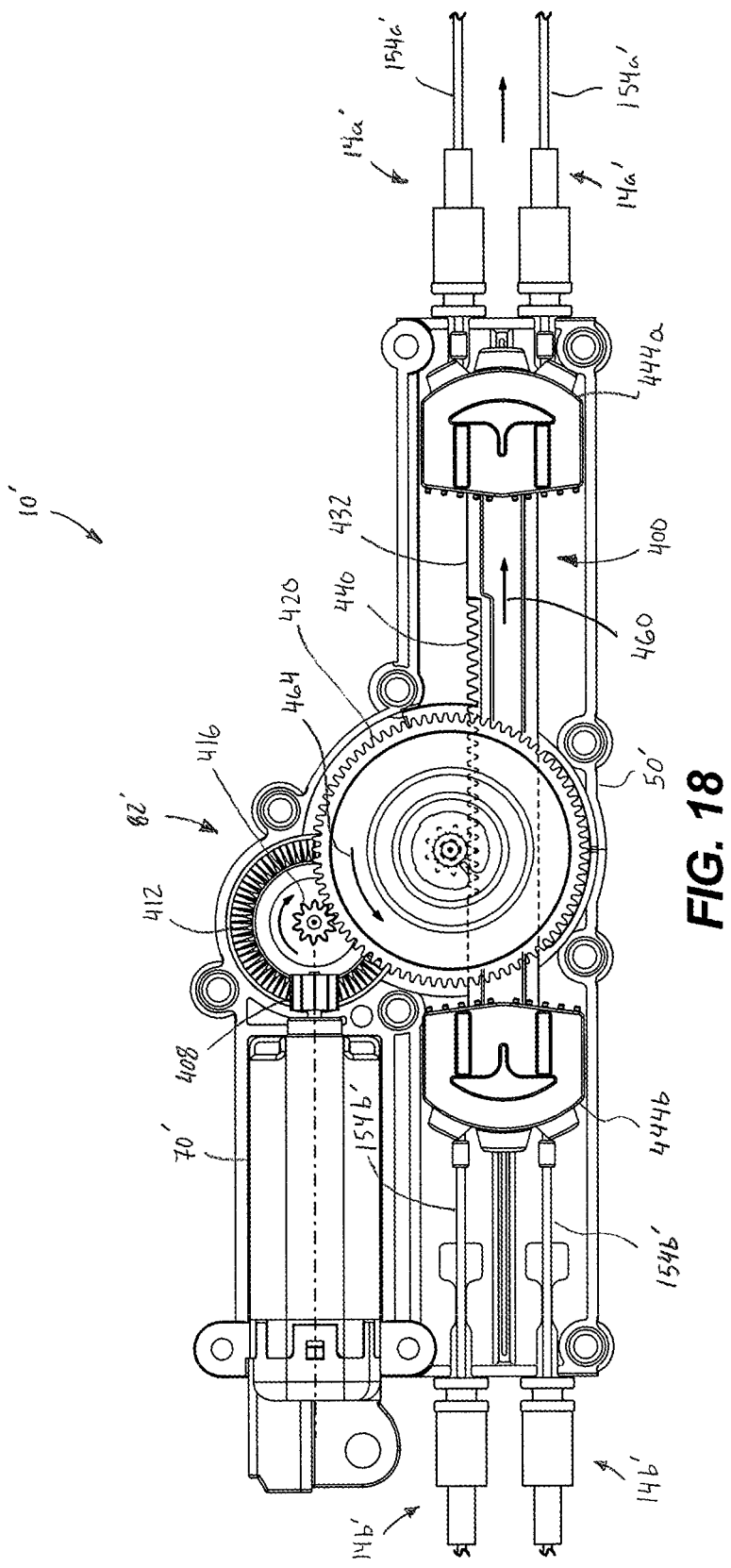
FIG. 18 is a top planar view of the actuator of FIG. 14 showing the rack assembly in a third position.

When the motor 70' is driven in the first motor direction, the rack 432 is moved in a first actuation direction 452 (i.e., left, as viewed from FIG. 17) by the gear assembly 82' as the third pinion 424 rotates in a first gear direction 456 (i.e., clockwise, as viewed from FIG. 17). The rack 432 moves in the first actuation direction 452 until the second end 436b of the rack 432 contacts an interior of the housing 50' at the first actuation position (FIG. 17). When the rack assembly 400 is in the neutral position (FIG. 16) none of the inner cables 154a',154b' of the first cables 14a' and the second cables 14b' is actuated (i.e., pulled to increase tension). In the first actuation position, the first inner cables 154a' are pulled into the housing 50', while the second inner cables 154b' are allowed to be released out of the housing 50' (e.g., via a slack spring). The increase in tension of the inner cables 154a' of the first cables 14a' may be used to actuate the first release latch mechanism 22a and/or other mechanisms. As described in greater detail above with respect to the actuator 10 of FIGS. 1-12, the auto-return assembly provides a biasing force to drive the transmission in reverse to return the transmission, and in particular the rack assembly 400, back into the neutral position (FIG. 16) when the motor 70' is deactivated or deenergized. More specifically, the auto-return assembly provides a biasing force to rotate the main gear 420 opposite to the first gear direction (i.e., counter-clockwise, as viewed from FIG. 17), thus driving the rack 432 opposite the first actuation direction 452 (i.e., right, as viewed from FIG. 17) from the first actuation position back into the neutral position.

When the motor 70' is driven in the second motor direction, the rack 432 is moved in a second actuation direction 460 (i.e., right, as viewed from FIG. 18), opposite to the first actuation direction 452, by the gear assembly 82' as the third pinion 424 rotates in a second gear direction 464 (i.e., counterclockwise, as viewed from FIG. 18). The rack 432 moves in the second actuation direction 460 until the first end 436a of the rack 432 contacts an interior of the housing 50' in the second actuation position. In the second actuation position, the second inner cables 154b' are pulled into the housing 50', while the first inner cables 154a' are allowed to be released out of the housing 50' (e.g., via a slack spring). The increase in tension of the inner cables 154b' of the second inner cable 14b' may be used to actuate the second release latch mechanism 22b and/or other mechanisms. As described in greater detail above with respect to the actuator 10 of FIGS. 1-12, the auto-return assembly provides a biasing force to drive the transmission in reverse to return the transmission, and in particular the rack assembly 400, back into the neutral position (FIG. 16) when the motor 70' is deactivated or deenergized. More specifically, the auto-return assembly provides a biasing force to rotate the main gear 420 opposite to the second gear direction 464 (i.e., clockwise, as viewed from FIG. 18), thus driving the rack 432 opposite the second actuation direction 460 (i.e., left, as viewed from FIG. 18) from the second actuation position back into the neutral position.

The components of the actuators 10, 10' of FIGS. 1-18 can be constructed from metal, plastic, or a combination of the two. In other embodiments, the components of the actuators 10, 10' may be formed of any other suitable material.

Various features and advantages of the disclosure are set forth in the following claims.

What is claimed is:

1. An actuator comprising:
   a motor;
   a gear assembly;
   a pulley selectively rotatable about an axis by the motor via the gear assembly;
   at least one biasing member;
   a first cable connected at one end to the pulley; and
   a second cable connected at one end to the pulley,
   wherein the pulley is rotatable in a first pulley direction to a first actuation position to increase tension in the first cable and is rotatable in a second pulley direction opposite the first pulley direction to a second actuation position to increase tension in the second cable, and wherein the at least one biasing member is operable to bias the pulley in the second pulley direction when the pulley is in the first actuation position and to bias the pulley in the first pulley direction when in the pulley is the second actuation position.

2. The actuator of claim 1, wherein the pulley defines a first groove to receive at least a portion of the first cable and a second groove to receive at least a portion of the second cable, the first groove spaced from the second groove in a direction parallel to the axis.

3. The actuator of claim 2, further comprising a cable cover including an arcuate wall that extends about at least a portion of the pulley adjacent the first and second grooves to contain the portion of the first cable within the first groove and the portion of the second cable within the second groove.

4. The actuator of claim 1, wherein the pulley is rotatable to a neutral position between the first and second actuation positions by the at least one biasing member in response to deenergization of the motor.

5. The actuator of claim 4, wherein the at least one biasing member is in the form of a torsion spring.

6. The actuator of claim 5, further comprising a spring carrier coupled to the pulley for rotation therewith about the axis, and wherein the spring carrier includes at least one spring engagement projection arranged to engage a first end of the torsion spring when the pulley is rotated in the first pulley direction from the neutral position and to engage a second end of the torsion spring when the pulley is rotated in the second pulley direction from the neutral position.

7. The actuator of claim 6, further comprising a housing including at least one spring support projection positioned to impede movement of the second end of the torsion spring when the pulley is rotated in the first pulley direction from the neutral position and to impede movement of the first end of the torsion spring from moving when the pulley is rotated in the second pulley direction from the neutral position.

8. The actuator of claim 4, wherein the neutral position is halfway between the first actuation position and the second actuation position.

9. A seat assembly comprising:
   a seat;
   a first seat mechanism including a first actuation member connected to a first end of a first cable;
   a second seat mechanism including a second actuation member connected to a first end of a second cable;
   an actuator including
      a motor,
      a gear assembly,
      a pulley assembly, and
      at least one biasing member,
   wherein a second end of the first cable and a second end of the second cable are concurrently coupled to the pulley assembly, wherein the pulley assembly is configured to rotate in one of a first direction and a second direction opposite the first direction in response to activation of the motor, and wherein the first cable is configured to actuate the first actuation member when the pulley assembly is rotated in the first direction to a first actuation position, and wherein the second cable is configured to actuate the second actuation member when the pulley assembly is rotated in the second direction to a second actuation position, and wherein the at least one biasing member is operable to bias the pulley assembly in the second direction when the pulley assembly is in the first actuation position and to bias the pulley assembly in the first direction when the pulley assembly is in the second actuation position.

10. The actuator of claim 9, wherein a pulley of the pulley assembly defines a first groove to receive at least a portion of the first cable and a second groove to receive at least a portion of the second cable, the first groove spaced from the second groove in a direction parallel to the axis.

11. The actuator of claim 10, wherein the pulley assembly further includes a cable cover including an arcuate wall that extends about at least a portion of the pulley adjacent the first and second grooves to contain the portion of the first cable within the first groove and the portion of the second cable within the second groove.

12. The seat assembly of claim 9, further comprising a first manual actuator operable to send a signal to the motor to rotate the pulley assembly in the first direction and a second manual actuator operable to send a signal to the motor to rotate the pulley assembly in the second direction.

13. The seat assembly of claim 9, wherein the pulley assembly is rotatable to a neutral position between the first and second actuation positions by the at least one biasing member in response to deenergization of the motor.

14. The seat assembly of claim 13, wherein the at least one biasing member is in the form of a torsion spring.

15. The seat assembly of claim 14, wherein the actuator further includes a spring carrier coupled to the pulley assembly for rotation therewith about the axis, and wherein the spring carrier includes at least one spring engagement projection arranged to engage a first end of the torsion spring when the pulley assembly is rotated to the first direction from the neutral position toward the first actuation position and to engage a second end of the torsion when the pulley assembly is rotated in the second direction from the neutral position toward the second actuation position.

16. The seat assembly of claim 15, wherein the actuator further includes a housing having at least one spring support projection positioned to impede movement of the second end of the torsion spring when the pulley assembly is rotated in the first direction from the neutral position and impede movement of the first end of the torsion spring from moving when the pulley assembly is rotated in the second direction from the neutral position.

17. The seat assembly of claim 13, wherein the neutral position is halfway between the first actuation position and the second actuation position.

18. An actuator comprising:
a motor having an output selectively rotatable in a first direction and a second direction opposite the first direction;
a transmission coupled to the output of the motor;
at least one biasing member
a first cable coupled to the transmission; and
a second cable coupled to the transmission,
wherein the motor is operable to dispose the transmission into a first position to increase tension in the first cable when the output of the motor is rotated in the first direction and to dispose the transmission into a second position to increase tension in the second cable when the output of the motor is rotated in the second direction, and
wherein the at least one biasing member is configured to bias the transmission from the first position when the transmission is in the first position and to bias the transmission from the second position when the transmission is in the second position.

19. The actuator of claim 18, wherein the transmission includes a pulley, wherein the first cable and the second cable are concurrently coupled to the pulley.

* * * * *